US011233448B2

(12) United States Patent
Endo et al.

(10) Patent No.: US 11,233,448 B2
(45) Date of Patent: Jan. 25, 2022

(54) SWITCHING CONTROL CIRCUIT AND SWITCHING CONTROL METHOD

(71) Applicant: FUJI ELECTRIC CO., LTD., Kawasaki (JP)

(72) Inventors: Yuta Endo, Matsumoto (JP); Hironobu Shiroyama, Hino (JP); Nobuyuki Hiasa, Matsumoto (JP); Hiroki Yamane, Matsumoto (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 0 days.

(21) Appl. No.: 17/211,507

(22) Filed: Mar. 24, 2021

(65) Prior Publication Data

US 2021/0234455 A1 Jul. 29, 2021

Related U.S. Application Data

(63) Continuation of application No. PCT/JP2020/015011, filed on Apr. 1, 2020.

(30) Foreign Application Priority Data

Apr. 19, 2019 (JP) .............................. JP2019-079860

(51) Int. Cl.
 *H02M 1/08* (2006.01)
 *H02M 3/155* (2006.01)
(52) U.S. Cl.
 CPC ............. *H02M 1/08* (2013.01); *H02M 3/155* (2013.01)
(58) Field of Classification Search
 CPC .................................. H02M 1/08; H02M 3/155

USPC .................................................. 327/108–112
See application file for complete search history.

(56) References Cited

U.S. PATENT DOCUMENTS

2012/0033455 A1\* 2/2012 Hosotani ................. H02M 1/38
 363/21.03

FOREIGN PATENT DOCUMENTS

JP 2011-223726 A 11/2011
JP 2012-105424 A 5/2012
JP 2014-082924 A 5/2014
(Continued)

OTHER PUBLICATIONS

International Search Report for PCT/JP2020/015011, dated Jun. 9, 2020.

*Primary Examiner* — Tomi Skibinski
(74) *Attorney, Agent, or Firm* — Rabin & Berdo, P.C.

(57) ABSTRACT

A switching control circuit for controlling a power supply circuit that includes an inductor to which an input voltage is applied and through which an inductor current flows, and a transistor configured to control the inductor current. The switching control circuit includes first and second error voltage output circuits that output first and second error voltages, based respectively on a feedback voltage corresponding to the output voltage and a reference voltage, and on an error signal corresponding to a difference between the level of the output voltage and a second level, when the power supply circuit is of a non-isolated type and an isolated type, respectively. The switching control circuit further includes a drive circuit that switches the transistor based on the inductor current, and on the first and second error voltage when the power supply circuit is of the non-isolated type and an isolated type, respectively.

19 Claims, 24 Drawing Sheets

(56) References Cited

FOREIGN PATENT DOCUMENTS

WO 2010/119761 A1 10/2010

* cited by examiner

SWITCHING CONTROL CIRCUIT AND SWITCHING CONTROL METHOD

CROSS-REFERENCE TO RELATED APPLICATIONS

This is a continuation application of International patent Application No. PCT/JP2020/015011 filed Apr. 1, 2020, which claims the benefit of priority to Japanese Patent Application No. 2019-079860 filed Apr. 19, 2019, the entire contents of each of which the entire contents of each of which are incorporated herein by reference.

BACKGROUND

Technical Field

The present disclosure relates to a switching control circuit and a switching control method.

Description of the Related Art

In common power supply circuits, the level of the output voltage thereof is detected and an output voltage at a target level is generated from an input voltage (e.g., Japanese Patent Application Publication No. 2014-82924).

Meanwhile, power supply circuits include non-isolated power supply circuits in which the input side and the output side thereof are not isolated from each other, and isolated power supply circuits in which the input side and the output side thereof are isolated from each other. Such a non-isolated power supply circuit is capable of detecting the output voltage thereof using voltage divider resistors or the like, whereas an isolated power supply circuit needs to use, for example, a shunt regulator or a photocoupler to detect the output voltage thereof.

As such, the element(s) and configuration to detect the output voltage differ depending on whether the power supply circuit is of a non-isolated type or an isolated type. Thus, it has been difficult to use a control circuit that controls a power supply circuit in common for both a non-isolated power supply circuit and an isolated power supply circuit.

The present disclosure is directed to provision of a switching control circuit that is usable in a non-isolated power supply circuit and an isolated power supply circuit.

SUMMARY

A first aspect of the present disclosure is a switching control circuit for controlling a power supply circuit that includes an inductor to which an input voltage is applied and through which an inductor current flows, and a transistor configured to control the inductor current, the switching control circuit being configured to switch the transistor based on the inductor current and an output voltage generated from the input voltage, the switching control circuit comprising: a first error voltage output circuit configured to output a first error voltage, corresponding to a difference between a level of the output voltage and a first level, based on a feedback voltage corresponding to the output voltage and a reference voltage, upon receiving a first signal indicating that the switching control circuit is used in a first power supply circuit, the first power supply circuit being of a non-isolated type; a second error voltage output circuit configured to output a second error voltage, based on an error signal corresponding to a difference between the level of the output voltage and a second level, upon receiving a second signal indicating that the switching control circuit is used in a second power supply circuit, the second power supply circuit being of an isolated type; and a drive circuit configured to switch the transistor based on the inductor current and the first error voltage, when the switching control circuit is used in the first power supply circuit, and switch the transistor based on the inductor current and the second error voltage, when the switching control circuit is used in the second power supply circuit.

A second aspect of the present disclosure is a switching control circuit for controlling a power supply circuit that includes an inductor to which an input voltage is applied and through which an inductor current flows, and a transistor configured to control the inductor current, the switching control circuit being configured to switch the transistor based on the inductor current and an output voltage generated from the input voltage, the switching control circuit comprising: an integrated circuit that comprises: a first terminal which receives a feedback voltage corresponding to the output voltage when the switching control circuit is used in a first power supply circuit that is of a non-isolated type, and receives a voltage at a predetermined level when the switching control circuit is used in a second power supply circuit that is of an isolated type; and a determination circuit configured to determine whether the switching control circuit is used in the first power supply circuit or the second power supply circuit, based on a received voltage at the first terminal.

A third aspect of the present disclosure is a switching control method for controlling a power supply circuit that includes an inductor to which an input voltage is applied and through which an inductor current flows, and a transistor configured to control the inductor current, by switching the transistor based on the inductor current and an output voltage generated from the input voltage, the switching control method comprising: outputting a first error voltage corresponding to a difference between a level of the output voltage and a first level, based on a feedback voltage corresponding to the output voltage and a reference voltage, upon receiving a first signal indicating that the power supply circuit is a first power supply circuit, the first power supply circuit being of a non-isolated type; outputting a second error voltage, based on an error signal corresponding to a difference between the level of the output voltage and a second level, upon receiving a second signal indicating that the power supply circuit is a second power supply circuit, the second power supply circuit being of an isolated type; and switching the transistor based on the inductor current and the first error voltage, when the power supply circuit is the first power supply circuit, and switching the transistor based on the inductor current and the second error voltage, when the power supply circuit is the second power supply circuit.

BRIEF DESCRIPTION OF THE DRAWINGS

FIG. 12 is a diagram illustrating an example of a voltage output circuit 602a.

DETAILED DESCRIPTION

At least following matters will become clear from the descriptions of the present specification and the accompanying drawings.
=====Embodiments=====
<<<Configuration of Switching Control IC 10>>>

Figure 1:
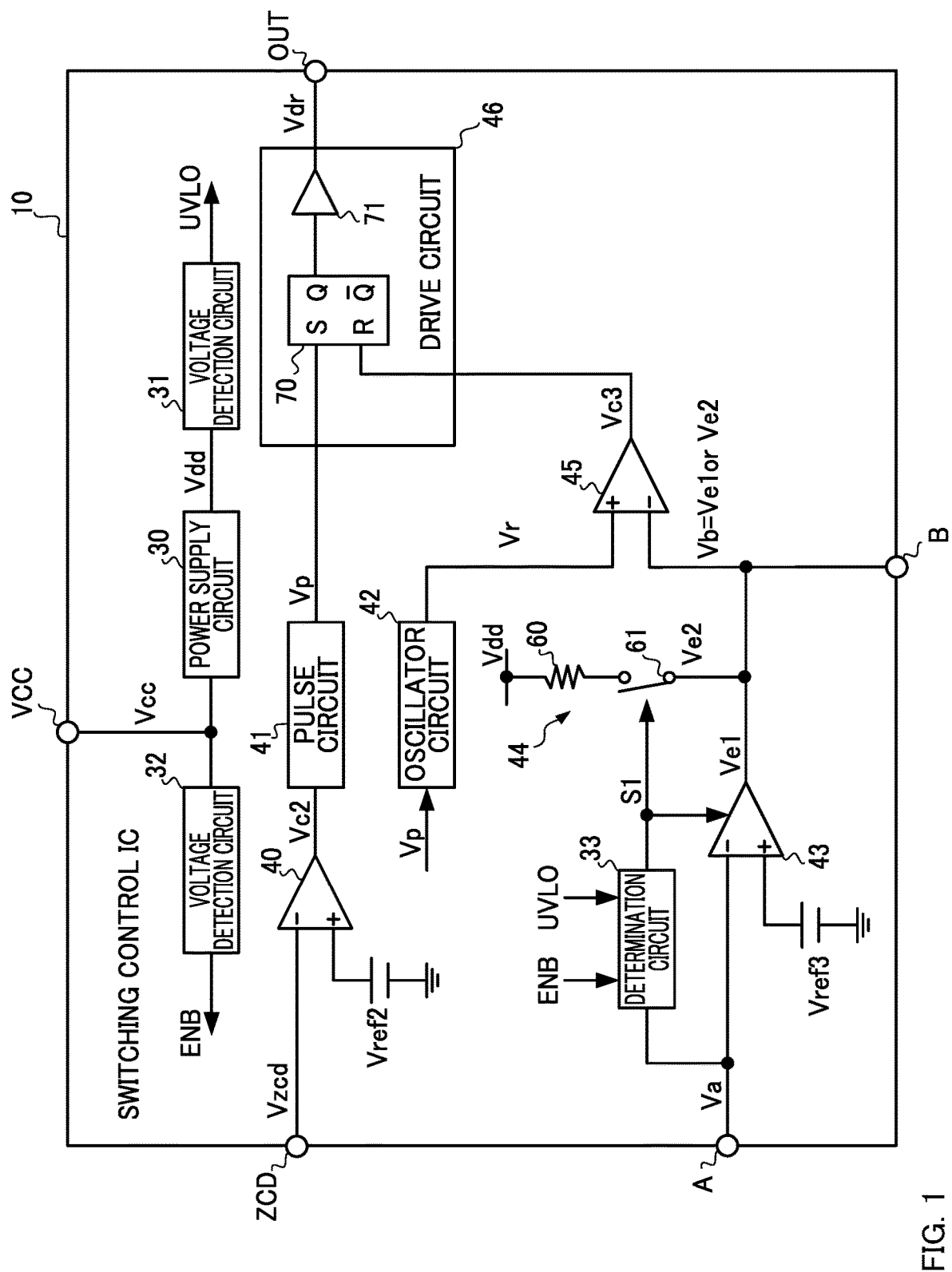
FIG. 1 is a diagram illustrating an example of a switching control IC 10.

FIG. 1 is a diagram illustrating a configuration of a switching control IC 10 according to an embodiment of the present disclosure. The switching control IC 10 (switching control circuit) is an integrated circuit that determines whether the switching control IC 10 is used in a non-isolated power supply circuit or an isolated power supply circuit, and controls an operation of the power supply circuit according to the determination result. Specifically, when used in a non-isolated switching power supply circuit, the switching control IC 10 operates based on a feedback voltage corresponding to the output voltage of the non-isolated switching power supply circuit. On the other hand, when used in an isolated switching power supply circuit, the switching control IC 10 operates based on a current indicating an error with respect to a target level of the output voltage.

The switching control IC 10 has terminals VCC, ZCD, A, B, and OUT. Note that the switching control IC 10 is provided with, for example, a GND terminal to which a ground voltage is applied and other terminals, but they are omitted here for convenience.

The terminal VCC is a terminal to which a power supply voltage Vcc for causing the switching control IC 10 to operate is applied.

The terminal ZCD is a terminal for detecting an inductor current of the power supply circuit in which the switching control IC 10 is used.

The terminal A (first terminal) is a terminal to which a voltage for determining whether the power supply circuit in which the switching control IC 10 is used is of a non-isolated type or an isolated type is applied. In the case where the switching control IC 10 is used in a non-isolated power supply circuit, the feedback voltage corresponding to the output voltage of the power supply circuit is applied to the terminal A. Note that the voltage at the terminal A will be referred to as a voltage Va.

The terminal B (second terminal) is a terminal to which elements for phase compensation are coupled in the case where the switching control IC 10 is used in a non-isolated power supply circuit, and to which a phototransistor is coupled in the case where the switching control IC 10 is used in an isolated power supply circuit. Although details will be described later, a current flowing through the phototransistor corresponds to an error signal indicating the error with respect to the target level of the output voltage. Note that the voltage at the terminal B will be referred to as a voltage Vb.

The terminal OUT is a terminal to which a drive signal Vdr for controlling switching of a switching device is applied.

The switching control IC 10 includes a power supply circuit 30, voltage detection circuits 31 and 32, a determination circuit 33, comparators 40 and 45, a pulse circuit 41, an oscillator circuit 42, an error amplifier circuit 43, an error voltage output circuit 44, and a drive circuit 46.

The power supply circuit 30 is a circuit (e.g., series regulator) that generates a power supply voltage Vdd for causing circuits inside the switching control IC 10 to operate, based on the power supply voltage Vcc applied from the outside the switching control IC 10. Note that the power supply voltage Vdd is applied to the circuits other than the power supply circuit 30 and a buffer circuit 71 (described later) in the drive circuit 46, among the circuits included in the switching control IC 10. In an embodiment of the present disclosure, the buffer circuit 71 in the drive circuit 46 operates based on the power supply voltage Vcc.

The voltage detection circuit 31 detects whether the level of the power supply voltage Vdd has reached a predetermined level X. Note that the "predetermined level X" is a level indicating that the power supply voltage Vdd has risen, and is, for example, 4.5 V in the case where the target level of the power supply voltage Vdd is 5V. The voltage detection circuit 31 also changes the level of a signal UVLO from a high level (hereinafter, high or high level) to a low level (hereinafter, low or low level) when the level of the power supply voltage Vdd rises to the predetermined level X. In an embodiment of the present disclosure, it is assumed that the level of the power supply voltage Vcc when the power supply voltage Vdd is at the predetermined level X is a "predetermined level Vt1".

The voltage detection circuit 32 detects whether the level of the power supply voltage Vcc has reached a "predetermined level Vt2" for starting operations of circuits inside the switching control IC 10. The voltage detection circuit 32 changes the level of a signal ENB from high to low when the power supply voltage Vcc rises to the predetermined level Vt2. Note that, in an embodiment of the present disclosure, the foregoing level Vt1 is lower than the predetermined level Vt2. Thus, when the power supply voltage Vcc rises from zero, the voltage detection circuit 31 firstly changes the signal UVLO to low, and then the voltage detection circuit 32 changes the signal ENB to low. Note that, in an embodiment of the present disclosure, the signals UVLO and ENB are inputted to circuits in the switching control IC 10, although this is omitted in FIG. 1.

Figure 2:
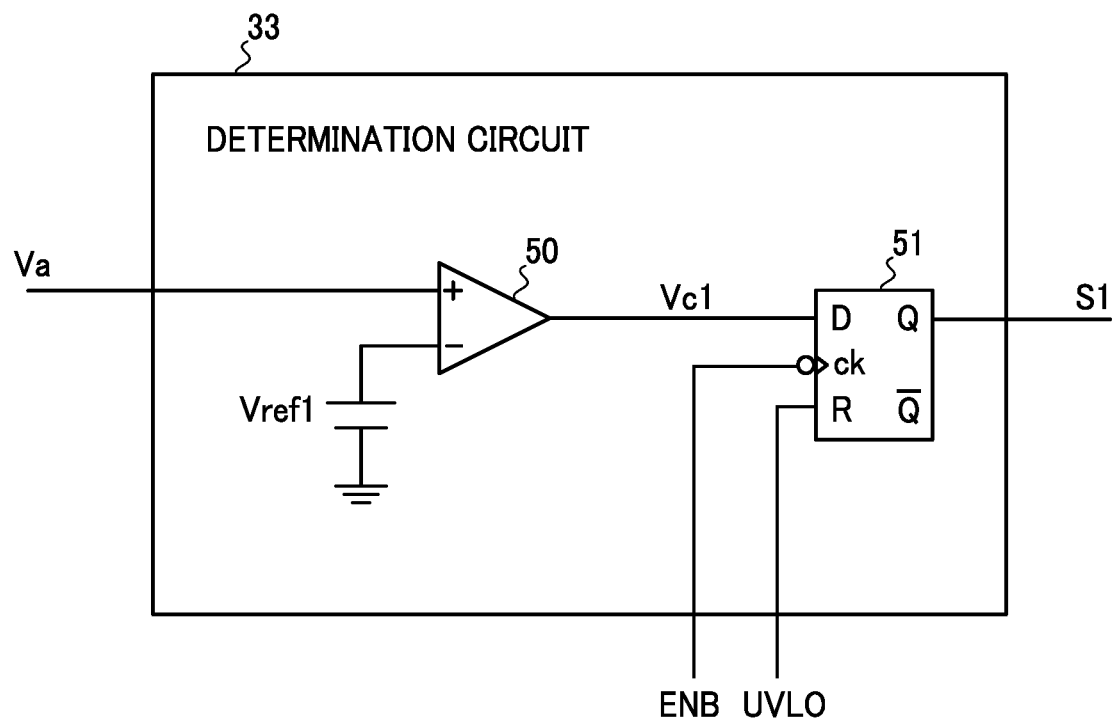
FIG. 2 is a diagram illustrating an example of a determination circuit 33.

The determination circuit 33 determines whether the switching control IC 10 is used in a non-isolated power supply circuit or in an isolated power supply circuit, based on the voltage Va at the terminal A. FIG. 2 is a diagram illustrating an example of a configuration of the determination circuit 33. The determination circuit 33 includes a comparator 50 and a D flip-flop 51.

The comparator 50 compares the voltage Va and a reference voltage Vref1 for distinguishing between a non-isolated power supply circuit and an isolated power supply circuit. Here, in the case where the switching control IC 10 is used in a non-isolated power supply circuit, a feedback voltage Vfb corresponding to the output voltage is applied to the terminal A. Whereas, in the case where the switching control IC 10 is used in an isolated power supply circuit, the switching control IC 10 operates without using the voltage Va at the terminal A. Accordingly, the level of the voltage Va for an isolated power supply circuit is set outside the range of the voltage Va for a non-isolated power supply circuit (the voltage range in which the feedback voltage Vfb varies), thereby being able to distinguish between non-isolated and isolated power supply circuits.

For example, in the case where the feedback voltage Vfb for a non-isolated power supply circuit varies within a range of, e.g., 0 to 3 V, the voltage Va for an isolated power supply circuit may be set at a predetermined level outside the range of 0 to 3V (e.g., 5.4 V). In this way, these two types of power supply circuits can be distinguished based on the voltage Va at the terminal A.

In an embodiment of the present disclosure, in order to distinguish between the voltage range of the feedback voltage Vfb for a non-isolated power supply circuit (e.g., 0 to 3 V) and the voltage Va for an isolated power supply circuit (e.g., 5.4 V), the reference voltage Vref1 (e.g., 4 V) is used, which is higher than the voltage range of the feedback voltage Vfb and lower than the voltage Va for the isolated power supply circuit.

Thus, by comparing the reference voltage Vref1 and the voltage Va, the comparator 50 can determine whether the power supply circuit in which the switching control IC 10 is used is of a non-isolated type or an isolated type.

The D flip-flop 51 is a circuit that holds the result of the comparison by the comparator 50 when the switching control IC 10 starts. The signal UVLO is inputted to the R input of the D flip-flop 51 and the signal ENB is inputted to the CK input of the D flip-flop 51. Thus, when the power supply voltage Vcc rises and the voltage detection circuit 31 changes the signal UVLO to low, reset of the D flip-flop 51 is released. Thereafter, when the power supply voltage Vcc further rises and the voltage detection circuit 32 changes the signal ENB to low, the result of the comparison by the comparator 50 inputted to the D input is held. Then, the result of the comparison held by the D flip-flop 51 is outputted from the Q output as a signal S1.

Note that, in an embodiment of the present disclosure, a low signal S1 (first signal) is outputted when it is determined that the switching control IC 10 is used in a non-isolated power supply circuit, whereas a high signal S1 (second signal) is outputted when it is determined that the switching control IC 10 is used in an isolated power supply circuit.

The comparator 40 is a so-called zero current detection circuit, and detects whether an inductor current IL (described later) in the power supply circuit is zero based on a voltage Vzcd at the terminal ZCD. Here, it is assumed that "zero" is the current value of the inductor current IL being substantially zero (e.g., 0.1 mA), for example. Thus, the comparator 40 compares the voltage Vzcd and a reference voltage Vref2 corresponding to a current of 0.1 mA, for example, and detects whether the inductor current IL is zero. Note that the comparator 40 changes a signal Vc2 to low when detecting that the inductor current IL is zero.

The pulse circuit 41 outputs a high pulse signal Vp when it is detected that the inductor current IL is zero and the signal Vc2 thus goes low.

The oscillator circuit 42 outputs a ramp wave Vr whose amplitude gradually increases, each time receiving the high pulse signal Vp.

The error amplifier circuit 43 (first error voltage output circuit) outputs an error voltage Ve1 for causing the output voltage of the power supply circuit to reach a target level, when it is determined that the switching control IC 10 is used in a non-isolated power supply circuit. Specifically, upon receiving the low signal S1, the error amplifier circuit 43 amplifies the difference between the voltage Va and a predetermined reference voltage Vref3 and outputs the resultant as the error voltage Ve1 (first error voltage).

On the other hand, upon receiving the high signal S1, the error amplifier circuit 43 stops outputting the error voltage Ve1. Note that the reference voltage Vref3 is a voltage determined according to the target level of an output voltage Vout1 of the non-isolated power supply circuit. Further, the error voltage Ve1 is stopped, for example, when the output of the error amplifier circuit 43 becomes a high-impedance state.

The error voltage output circuit 44 (second error voltage output circuit) is a circuit that outputs an error voltage Ve2 for causing the output voltage of the power supply circuit to reach a target level, when it is determined that the switching control IC 10 is used in an isolated power supply circuit, and includes a resistor 60 and a switch 61. Note that, although details will be described later, when the switching control IC 10 is used in an isolated power supply circuit, a phototransistor that generates a current corresponding to an error with respect to the target level of the output voltage is coupled to the terminal B.

The switch 61 is provided between the terminal B and the resistor 60 having one end thereof to which the power supply voltage Vdd is applied. The switch 61 coupled in series with the resistor 60 is turned on upon receiving the high signal S1, and is turned off upon receiving the low signal S1.

Thus, when the switch 61 receives the high signal S1 and is thereby turned on, the current through the phototransistor (described later) flows through the resistor 60. Then, the error voltage Ve2 (second error voltage) corresponding to the error with respect to the target level of the output voltage is outputted from the resistor 60. On the other hand, when the switch 61 receives the low signal S1 and is thereby turned off, the error voltage Ve2 stops being outputted.

As such, the error amplifier circuit 43 outputs the error voltage Ve1 upon receiving the low signal S1, and the error voltage output circuit 44 outputs the error voltage Ve2 upon receiving the high signal S1. Thus, in an embodiment of the present disclosure, only one of the error amplifier circuit 43 and the error voltage output circuit 44 operates and outputs a voltage corresponding to the error in the output voltage. Note that the voltage applied to the terminal B is the voltage Vb, and thus, the voltage Vb results in the error voltage Ve1 when the signal S1 is low, whereas the voltage Vb results in the error voltage Ve2 when the signal S1 is high.

The comparator 45 compares the magnitudes between the voltage Vb at the terminal B and the ramp wave Vr, and outputs a signal Vc3 as the result of the comparison. Here, the comparator 45 has an inverting input terminal to which the voltage Vb is applied and a non-inverting input terminal to which the ramp wave Vr is applied. Thus, the signal Vc3 is low when the level of the ramp wave Vr is lower than the level of the voltage Vb, whereas the signal Vc3 is high when the level of the ramp wave Vr is higher than the level of the voltage Vb.

The drive circuit 46 turns on the switching device (described later) upon receiving the pulse signal Vp, and turns off the switching device when the signal Vc3, which is the result of the comparison by the comparator 45, goes high. The drive circuit 46 includes an SR flip-flop 70 and the buffer circuit 71.

The pulse signal Vp is inputted to the S input of the SR flip-flop 70, and the signal Vc3 is inputted to the R input of the SR flip-flop 70. Thus, when the pulse signal Vp goes high, the Q output of the SR flip-flop 70 goes high. On the other hand, when the signal Vc3 goes high, the Q output goes low.

The buffer circuit 71 outputs the drive signal Vdr for driving the switching device, in response to the Q output of the SR flip-flop 70. Specifically, the buffer circuit 71 outputs a high drive signal Vdr when the Q output goes high, and outputs a low drive signal Vdr when the Q output goes low.

<<<Example of Non-Isolated Power Supply Circuit>>>

Figure 3:
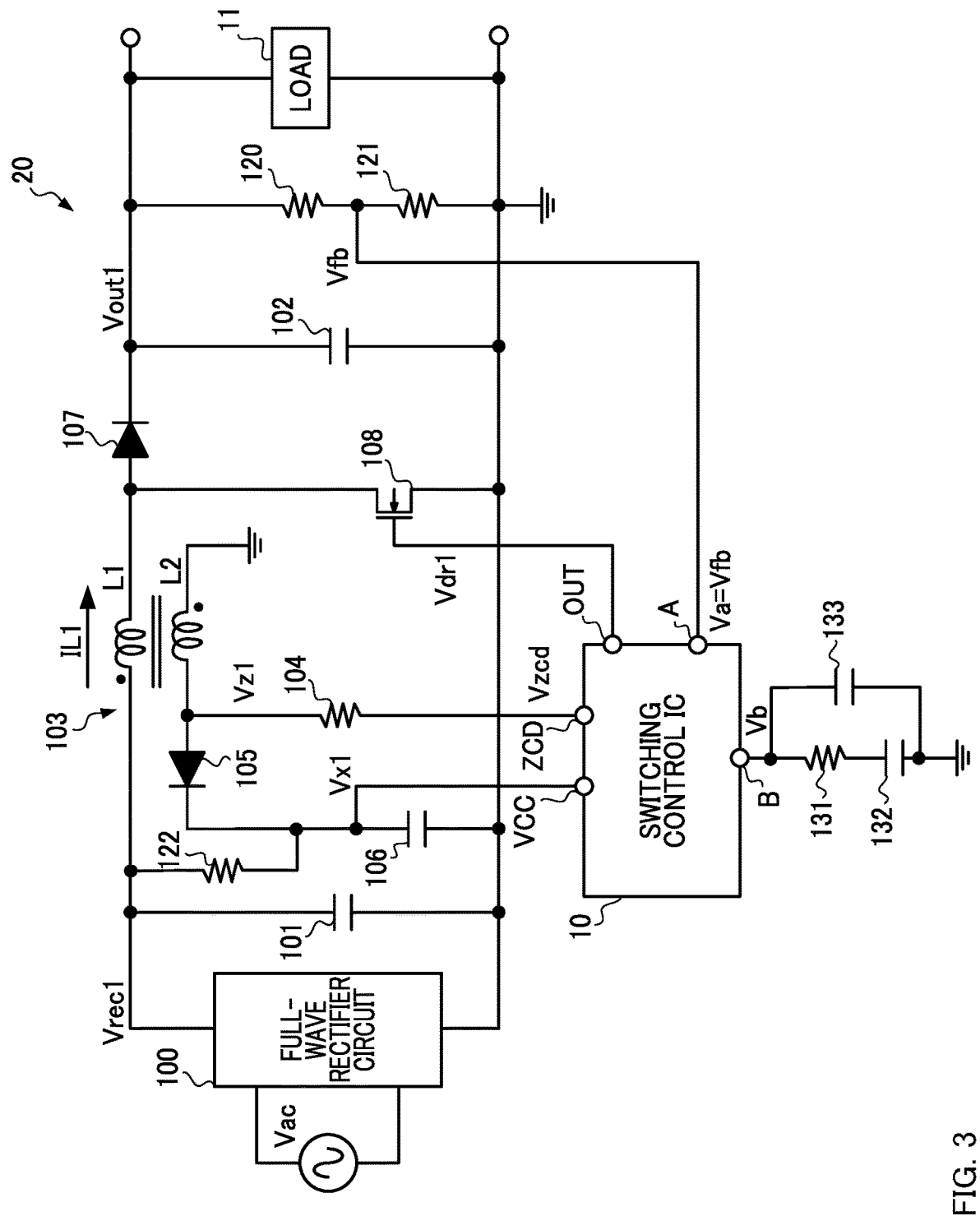
FIG. 3 is a diagram illustrating an example of a non-isolated power supply circuit 20.

FIG. 3 is a diagram illustrating an example of a configuration of a non-isolated power supply circuit 20. The power supply circuit 20 (first power supply circuit) is a boost chopper AC-DC converter that generates the output voltage Vout1 at a target level V1 (e.g., 400 V) at a load 11 from an AC voltage Vac of a commercial power supply. Note that the load 11 is, for example, an electronic device such as a DC-DC converter, a microcomputer, and/or the like.

The power supply circuit 20 includes a switching control IC 10, a full-wave rectifier circuit 100, capacitors 101, 102, 106, 132, and 133, a transformer 103, resistors 104, 120, 121, 122, and 131, diodes 105 and 107, and an NMOS transistor 108.

The switching control IC 10 is the control IC explained in FIG. 1, and controls the switching of the NMOS transistor 108 such that the level of the output voltage Vout1 reaches the target level V1 (first level), while improving the power factor of the power supply circuit 20.

The full-wave rectifier circuit 100 full-wave rectifies the predetermined AC voltage Vac applied thereto, and outputs the resultant as a voltage Vrec1 to the capacitor 101. Note that the AC voltage Vac is, for example, a voltage of 100 to 240 V having a frequency of 50 to 60 Hz.

The capacitor 101 smooths the voltage Vrec1, and thus the smoothed voltage Vrec1 is applied to a main coil L1 of the transformer 103. Note that the voltage applied to the main coil L1 (inductor) corresponds to an input voltage.

The transformer 103 has the main coil L1 and an auxiliary coil L2 magnetically coupled to the main coil L1. Here, in an embodiment of the present disclosure, the auxiliary coil L2 is wound such that the voltage generated in the auxiliary coil L2 has a polarity opposite to the polarity of the voltage generated in the main coil L1.

The resistor 104 is provided between one end of the auxiliary coil L2 and the terminal ZCD. Thus, a voltage Vz1 generated in the auxiliary coil L2 is applied as the voltage Vzcd to the terminal ZCD.

Moreover, the diode 105 and the capacitor 106 are provided between the one end of the auxiliary coil L2 and the ground. Thus, the capacitor 106 is charged with the voltage Vz1. Further, in an embodiment of the present disclosure, a charge voltage Vx1 of the capacitor 106 is supplied as the power supply voltage Vcc of the switching control IC 10.

The capacitor 102 configures a boost chopper circuit together with the main coil L1, the diode 107, and the NMOS transistor 108. Thus, the charge voltage of the capacitor 102 results in the direct-current (DC) output voltage Vout1.

The NMOS transistor 108 is a switching device for controlling the power to the load 11. It is assumed that, in an embodiment of the present disclosure, the NMOS transistor 108 is a metal oxide semiconductor (MOS) transistor but it is not limited thereto. The NMOS transistor 108 may be, for example, a bipolar transistor as long as it is a transistor capable of controlling the power.

The resistors 120 and 121 configure a voltage divider circuit that divides the output voltage Vout1, and generate the feedback voltage Vfb to be used in switching the NMOS transistor 108. Note that the feedback voltage Vfb generated at a node to which the resistors 120 and 121 are coupled is applied to the terminal A. Thus, in the power supply circuit 20, the voltage Va at the terminal A is the feedback voltage Vfb.

The resistor 122 functions as a starting resistor upon startup of the power supply circuit 20. The resistor 131 and the capacitors 132 and 133 are phase compensation elements for stabilizing the feedback loop in the power supply circuit 20, and are provided between the terminal B and the ground.

==Operation of Non-Isolated Power Supply Circuit==

Figure 4:
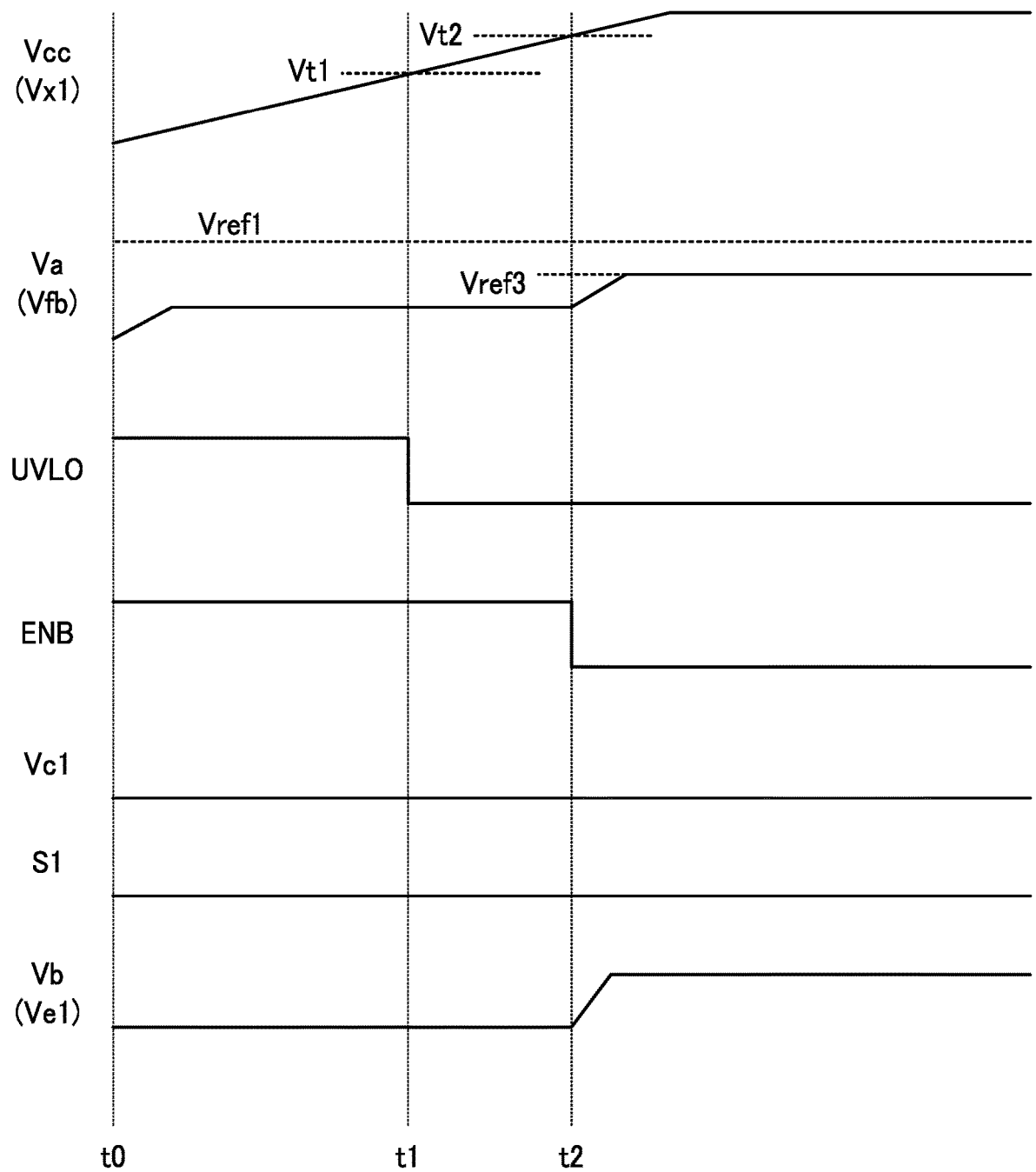
FIG. 4 is a diagram for explaining an operation of a power supply circuit 20 upon startup.

FIG. 4 is a diagram for explaining an operation of the power supply circuit 20 upon startup. Here, the power supply voltage Vcc is the voltage Vx1, and the voltage Va is the feedback voltage Vfb.

Firstly, when the AC voltage Vac is supplied to the power supply circuit 20 at a time t0, the voltage Vrec1 full-wave rectified by the full-wave rectifier circuit 100 is applied to the capacitor 106 via the starting resistor 122. As a result, the charge voltage Vx1 of the capacitor 106 rises, and thus the power supply voltage Vcc (=Vx1) at the terminal VCC rises as well.

In addition, when the voltage Vrec1 rises, the capacitor 102 is charged via the diode 107, and thus the output voltage Vout1 rises. As a result, the feedback voltage Vfb obtained by dividing the output voltage Vout1 rises as well. Note that, at this time, the output voltage Vout1 does not rise higher than the effective value of the AC voltage Vac. Accordingly, the feedback voltage Vfb does not rise higher than a value obtained by dividing the effective value of the AC voltage Vac using the resistors 120 and 121, either. That is, before the switching control IC 10 starts switching control, the range in which the feedback voltage Vfb varies is from zero to the voltage value obtained by dividing the effective value of the AC voltage Vac using the resistors 120 and 121.

Then, when the power supply voltage Vcc (=Vx1) rises to the predetermined level Vt1 at a time t1, the voltage detection circuit 31 changes the signal UVLO to low. As a result, reset of the D flip-flop 51 is released.

In addition, when the power supply voltage Vcc (=Vx1) further rises to the predetermined level Vt2 at a time t2, the voltage detection circuit 32 changes the signal ENB to low.

Here, the voltage Vref1 in the comparator 50 of the determination circuit 33 is set to be higher than, for example, the value obtained by dividing the effective value of the AC voltage Vac using the resistors 120 and 121. Accordingly, at the time t2, the D flip-flop 51 holds a low comparison result from the comparator 50, and thus the level of the signal S1 is maintained low.

Figure 5:
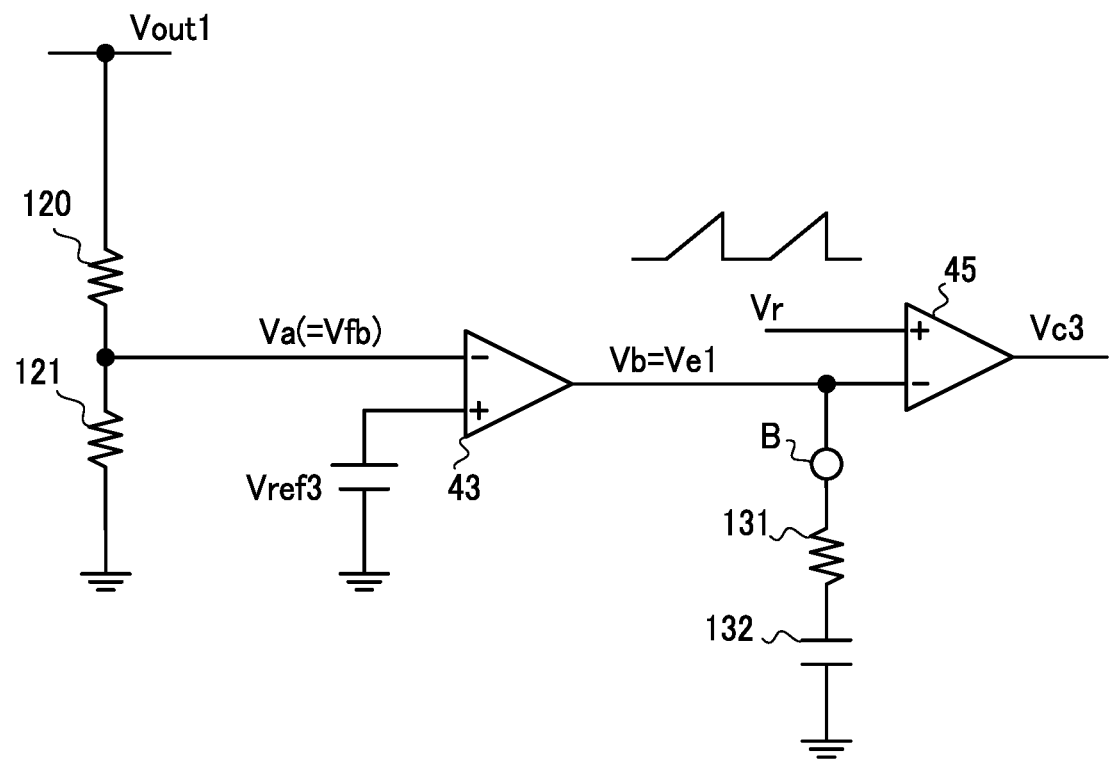
FIG. 5 is a diagram illustrating a configuration of part of a switching control IC 10.

As a result, in the switching control IC 10 in FIG. 1, only the error amplifier circuit 43 out of the error amplifier circuit 43 and the error voltage output circuit 44 operates, as illustrated in FIG. 5. Note that, in FIG. 5, the error voltage output circuit 44 is omitted for ease of understanding.

In addition, when the signal ENB goes low at the time t2, circuits in the switching control IC 10 including the error amplifier circuit 43 start operating. As a result, the error amplifier circuit 43 outputs the error voltage Ve1 corresponding to the difference between the voltage Va (=Vfb) and the reference voltage Vref3, and the error voltage Ve1 rises. Note that, although details will be described later, in the power supply circuit 20, the error amplifier circuit 43 operates such that the level of the feedback voltage Vfb and the level of the reference voltage Vref3 match each other. Thus, from the time t2 and thereafter, the voltage Va (=Vfb) rises to the reference voltage Vref3.

Figure 6:
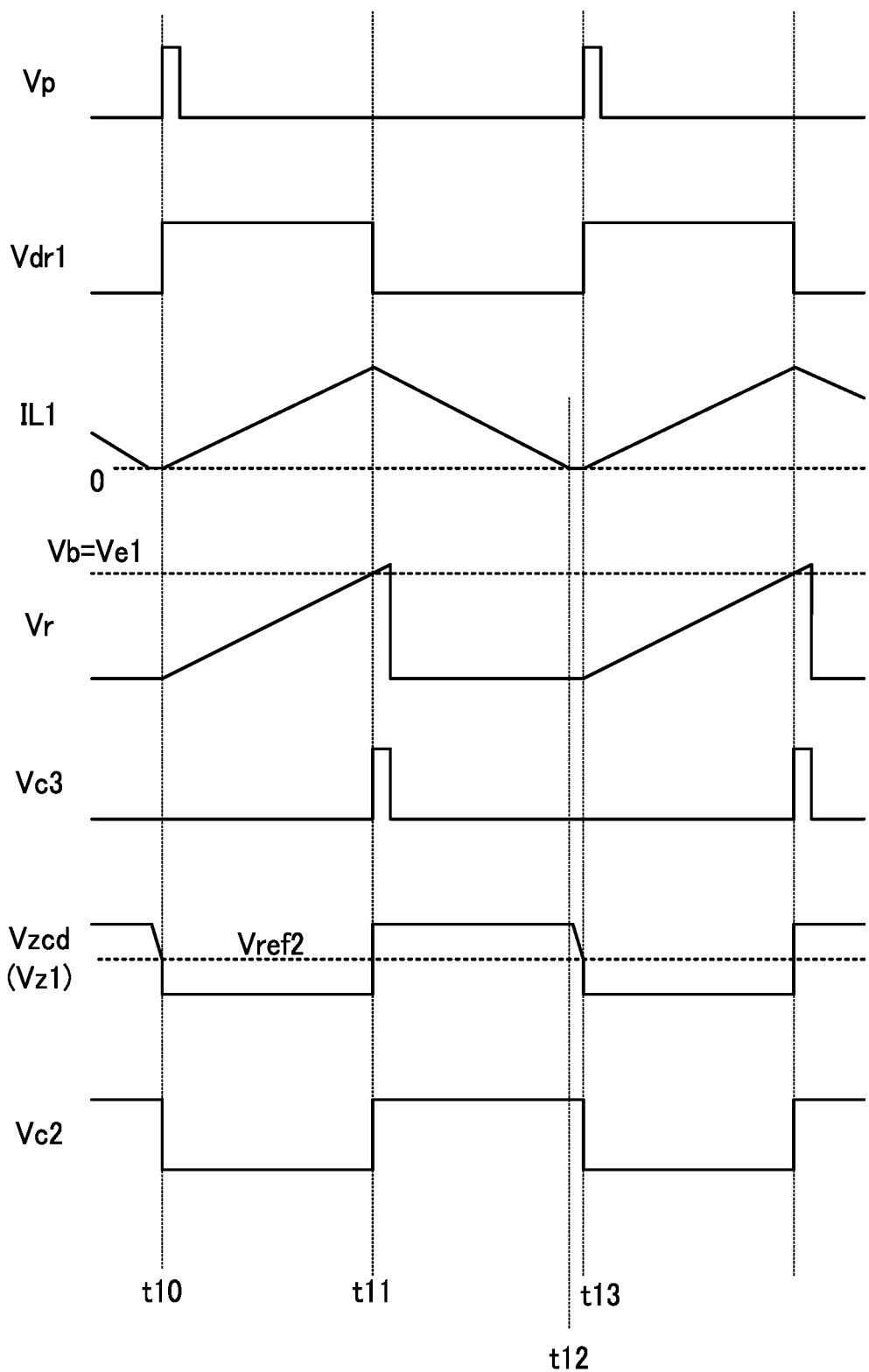
FIG. 6 is a diagram for explaining an operation of a power supply circuit 20.

FIG. 6 is a diagram for explaining an operation of the power supply circuit 20 after startup. Note that the timing of startup of the power supply circuit 20 is, for example, the time t2, at which the signal ENB goes low and circuits in the switching control IC 10 start operating.

Firstly, when the pulse signal Vp is outputted at a time t10, a drive signal Vdr1 goes high, thereby turning on the NMOS transistor 108. As a result, an inductor current IL1 increases. In addition, when the pulse signal Vp is outputted, the amplitude of the ramp wave Vr from the oscillator circuit 42 increases.

Then, when the amplitude level of the ramp wave Vr becomes higher than the level of the voltage Vb (=Ve1) at a time t11, the comparator 45 changes the signal Vc3 to high. As a result, the SR flip-flop 70 is reset, and the signal Vdr1 goes low.

When the signal Vdr1 goes low, the NMOS transistor 108 is turned off, and thus the inductor current IL1 decreases gradually. In addition, when the NMOS transistor 108 is turned off, the voltage on the input side (on the voltage Vrec1 side) of the main coil L1 becomes lower than the voltage on the output side (on the output voltage Vout1 side) of the main coil L1. Thus, the polarity of the voltage Vz1 at one end of the auxiliary coil L2, having the other end grounded, becomes positive. As a result, the voltage Vzcd (=Vz1) becomes higher than the reference voltage Vref2, and thus the signal Vc2 from the comparator 40 goes high.

Then, when the inductor current IL1 becomes substantially zero at a time t12, the voltage Vz1 across the auxiliary coil L2 magnetically coupled to the main coil L1 starts dropping abruptly. As a result, at a time t13, the voltage Vz1 becomes lower than the reference voltage Vref2, and thus the signal Vc2 from the comparator 40 goes low.

When the signal Vc2 from the comparator 40 goes low, the pulse signal Vp is outputted, thereby turning on the NMOS transistor 108. Then, from the time t13 and thereafter, the operations from the time t10 to the time t13 are repeated.

==Feedback Control and Power Factor Improvement==

Here, in the power supply circuit 20, when the output voltage Vout1 becomes higher from the target level V1 (e.g., 400 V), the feedback voltage Vfb rises. As a result, the error voltage Ve1 drops and the time period during which the NMOS transistor 108 is on becomes shorter. Accordingly, the output voltage Vout1 drops. On the other hand, as the output voltage Vout1 becomes lower from the target level V1, the feedback voltage Vfb drops. As a result, the error voltage Ve1 rises and the time period during which the NMOS transistor 108 is on becomes longer. Thus, the output voltage Vout1 rises. As such, in the power supply circuit 20, the output voltage Vout1 is feedback-controlled so as to reach the target level V1.

Accordingly, the feedback voltage Vfb is constant while the power supply circuit 20 generates the output voltage Vout1 at the target level V1 from the predetermined AC voltage Vac and supplies power to a constant load. As a result, the error voltage Ve1 outputted from the error amplifier circuit 43 is also constant, and thus the time period during which the NMOS transistor 108 is on (e.g., the time period from the time t10 to the time t11) is also constant.

Then, when the level of the voltage Vrec1 obtained by rectifying the AC voltage Vac rises upon turning on the NMOS transistor 108, the current value of the inductor current IL1 increases as well. As a result, the waveform of the peaks of the inductor current IL1 results in the same as the waveform of the voltage Vrec1, thereby improving the power factor.

Accordingly, the power supply circuit 20 operates as a power factor correction (PFC) circuit. As such, the switching control IC 10 enables the non-isolated power supply circuit 20 to perform a desired operation.

<<<Example of Isolated Power Supply Circuit>>>

Figure 7:
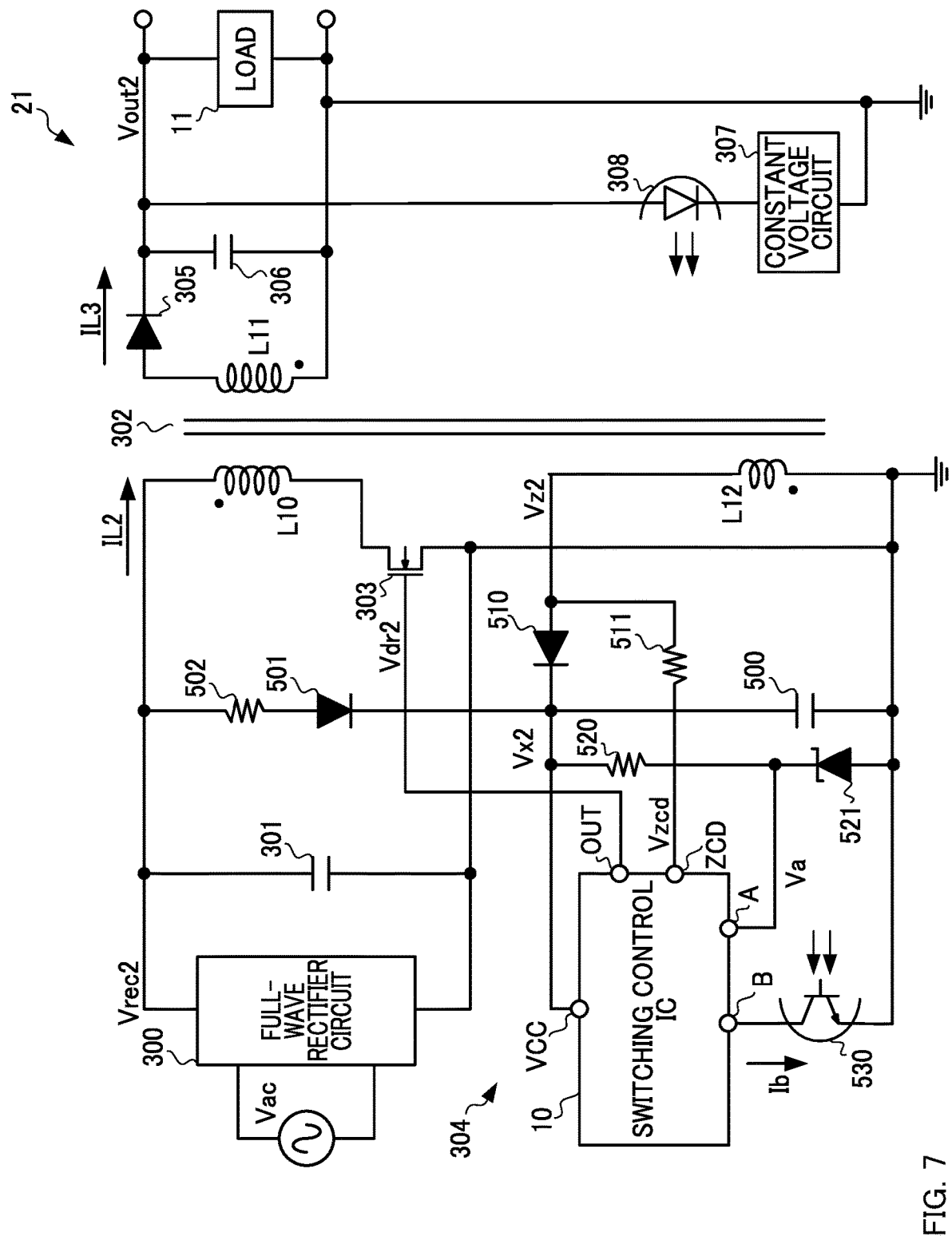
FIG. 7 is a diagram illustrating an example of an isolated power supply circuit 21.

FIG. 7 is a diagram illustrating an example of a configuration of an isolated power supply circuit 21. The power supply circuit 21 (second power supply circuit) is a flyback AC-DC converter that generates an output voltage Vout2 of a target level V2 (e.g., 15 V) at a load 11 from an AC voltage Vac of a commercial power supply.

The power supply circuit 21 comprises a full-wave rectifier circuit 300, capacitors 301 and 306, a transformer 302, an NMOS transistor 303, a control block 304, a diode 305, a constant voltage circuit 307, and a light emitting diode 308.

The full-wave rectifier circuit 300 full-wave rectifies the predetermined AC voltage Vac applied thereto, and outputs the resultant as a voltage Vrec2 to the capacitor 301.

The capacitor 301 smooths the voltage Vrec2, and thus the smoothed voltage Vrec2 is applied to the transformer 302.

The transformer 302 comprises a primary coil L10 (inductor), a secondary coil L11, and an auxiliary coil L12. The primary coil L10, the secondary coil L11, and the auxiliary coil L12 are isolated from one another. In the transformer 302, a voltage is generated across the secondary coil L11 on a secondary side according to variation in the voltage across the two ends of the primary coil L10 on a primary side, and a voltage is generated across the auxiliary coil L12 on the primary side according to variation in the voltage across the primary coil L10.

In addition, the drain of the NMOS transistor 303 is coupled to one end of the primary coil L10. Thus, the voltage across the secondary coil L11 and the voltage across the auxiliary coil L12 vary when switching of the NMOS transistor 303 is started. Note that the primary coil L10 and the secondary coil L11 are electromagnetically coupled to each other with the opposite polarities, and the secondary coil L11 and the auxiliary coil L12 are electromagnetically coupled to each other with the same polarity.

The control block 304 is a circuit block for controlling the switching of the NMOS transistor 303. Details will be described later.

The diode 305 rectifies the voltage across the secondary coil L11, and the capacitor 306 smooths the rectified voltage. As a result, a smoothed output voltage Vout2 is generated at the capacitor 306. Note that the output voltage Vout2 results in a DC voltage (e.g., 15 V) at the target level V2 (second level).

The constant voltage circuit 307 generates a constant DC voltage, and is configured using a shunt regulator, for example.

The light emitting diode 308 is an element that emits light having an intensity corresponding to the difference between the output voltage Vout2 and the output of the constant voltage circuit 307, and configures a photocoupler with a phototransistor 530 which will be described later. In an embodiment of the present disclosure, the intensity of the light from the light emitting diode 308 becomes stronger as the level of the output voltage Vout2 rises.

<<<Control Block 304>>>

The control block 304 includes a switching control IC 10, a capacitor 500, diodes 501 and 510, resistors 502, 511, and 520, a Zener diode 521, and the phototransistor 530.

The switching control IC 10 is the integrated circuit explained in FIG. 1, and controls the switching of the NMOS transistor 303.

The terminal VCC is coupled to one end of the capacitor 500 having the other end grounded, the cathode of the diode 501, and the cathode of the diode 510. Thus, the capacitor 500 is charged with a current from the diode 501 and a current from the diode 510. A charge voltage Vx2 across the capacitor 500 serves as the power supply voltage Vcc for operating the switching control IC 10. Note that the current from the diode 510 is generated after the switching control IC 10 is started. Thus, the switching control IC 10 is started based on the charge voltage Vx2 generated by the current from the diode 501.

The resistor 511 is coupled between the terminal ZCD and the auxiliary coil L12. Thus, a voltage Vz2 generated across the auxiliary coil L12 is applied to the terminal ZCD as the voltage Vzcd. Further, the auxiliary coil L12 generates a voltage with the polarity opposite to the polarity of the primary coil L10, as mentioned above. Accordingly, the auxiliary coil L12 generates a positive voltage Vz2 when an inductor current IL2 flowing through the primary coil L10 is decreasing, and the auxiliary coil L12 generates a negative voltage Vz2 when the inductor current IL2 flowing through the primary coil L10 is increasing.

The terminal A is coupled to one end of the resistor 520, having the other end to which the charge voltage Vx2 is applied, and the cathode of the Zener diode 521. Thus, when the charge voltage Vx2 becomes sufficiently high, the voltage Va applied to the terminal A results in a breakdown voltage Vz0 (e.g., 5.1 V) of the Zener diode 521.

The terminal B is a terminal at which an error voltage indicating the difference between the level of the output voltage Vout2 and the target level V2 is generated, and is coupled to the phototransistor 530. The phototransistor 530 causes a bias current Ib having a magnitude corresponding to the intensity of the light from the light emitting diode 308 to flow from the terminal B to the ground. Thus, the phototransistor 530 operates as a transistor that generates a sink current. Note that an element such as a capacitor and/or the like for removing noise may be provided between the terminal B and the ground.

The terminal OUT is coupled to the gate of the NMOS transistor 303. Thus, the NMOS transistor 303 is switched in response to a drive signal Vdr2.

==Operation of Isolated Power Supply Circuit==

Figure 8:
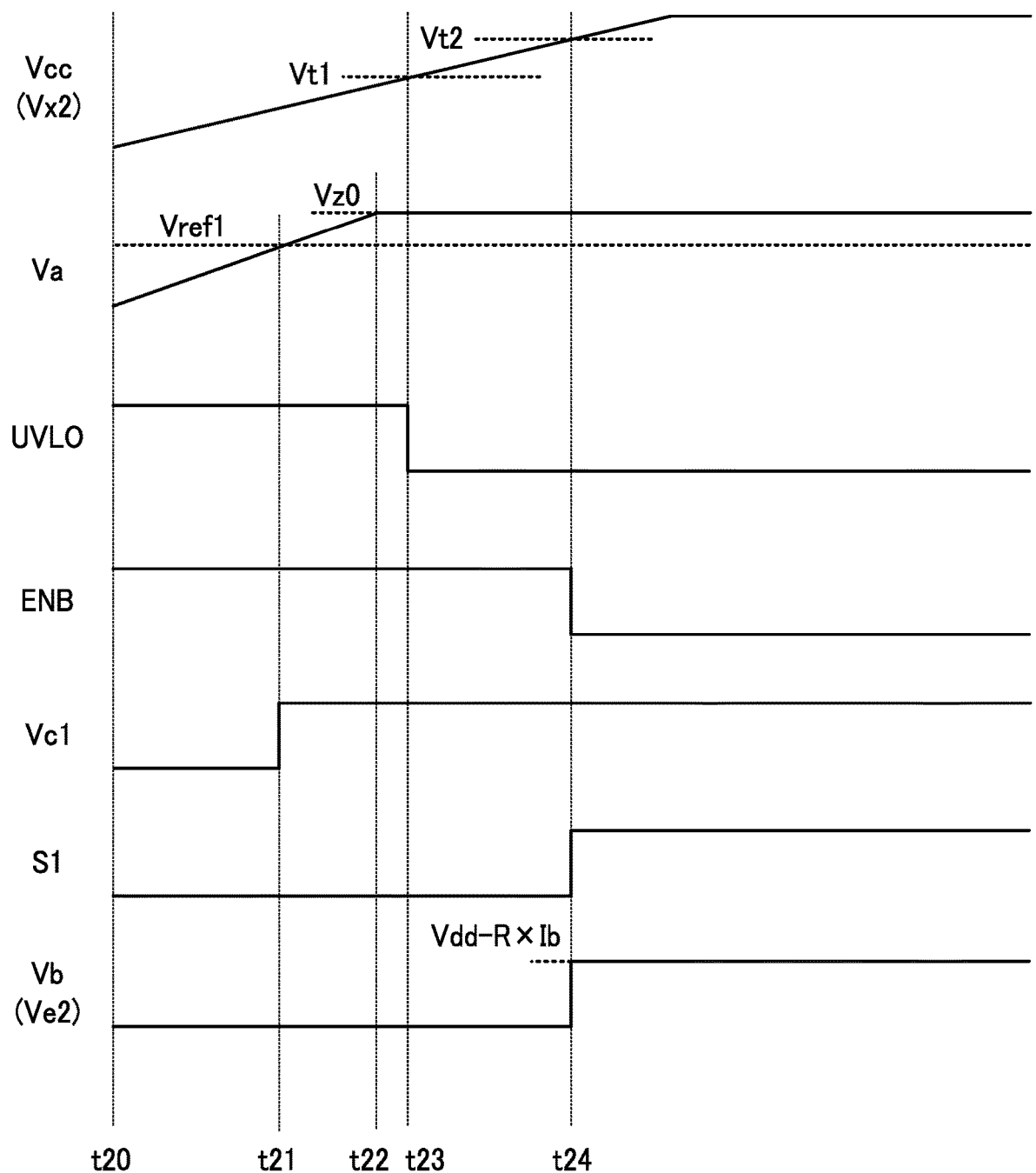
FIG. 8 is a diagram for explaining an operation of a power supply circuit 21 upon startup.

FIG. 8 is a diagram for explaining an operation of the power supply circuit 21 upon startup. Here, the power supply voltage Vcc results in the voltage Vx2.

Firstly, when the AC voltage Vac is supplied to the power supply circuit 21 at a time t20 and the voltage Vrec2 is generated, the capacitor 500 is charged via the diode 501. As a result, the charge voltage Vx2 across the capacitor 500 rises, and thus the power supply voltage Vcc (=Vx2) at the terminal VCC rises as well.

In addition, as the power supply voltage Vcc (=Vx2) rises, the voltage Va rises as well. At a time t21, the voltage Va becomes higher than the reference voltage Vref1 of the comparator 50. As a result, a signal Vc1 from the comparator 50 goes high. Note that, in an embodiment of the present disclosure, the resistance value of the resistor 520 and the breakdown voltage Vz0 of the Zener diode 521 are selected such that the voltage Va becomes higher than the reference voltage Vref1 upon startup of the power supply circuit 21.

When the power supply voltage Vcc further rises and the voltage Va reaches the breakdown voltage Vz0 at a time t22, the voltage Va is clamped at the breakdown voltage Vz0. Note that, in an embodiment of the present disclosure, the breakdown voltage Vz0 (e.g., 5.4 V) is set at a voltage higher than the reference voltage Vref1. Thus, the voltage Va becomes higher than the reference voltage Vref1 without fail when the Zener diode 521 is turned on.

Then, at a time t23, when the power supply voltage Vcc (=Vx2) rises to the predetermined level Vt1, the voltage detection circuit 31 changes the signal UVLO to low. As a result, reset of the D flip-flop 51 is released.

In addition, at a time t24, when the power supply voltage Vcc (=Vx2) further rises to the predetermined level Vt2, the voltage detection circuit 32 changes the signal ENB to low. When the signal ENB goes low, the D flip-flop 51 holds a high comparison result from the comparator 50, and thus the signal S1 goes high.

Figure 9:
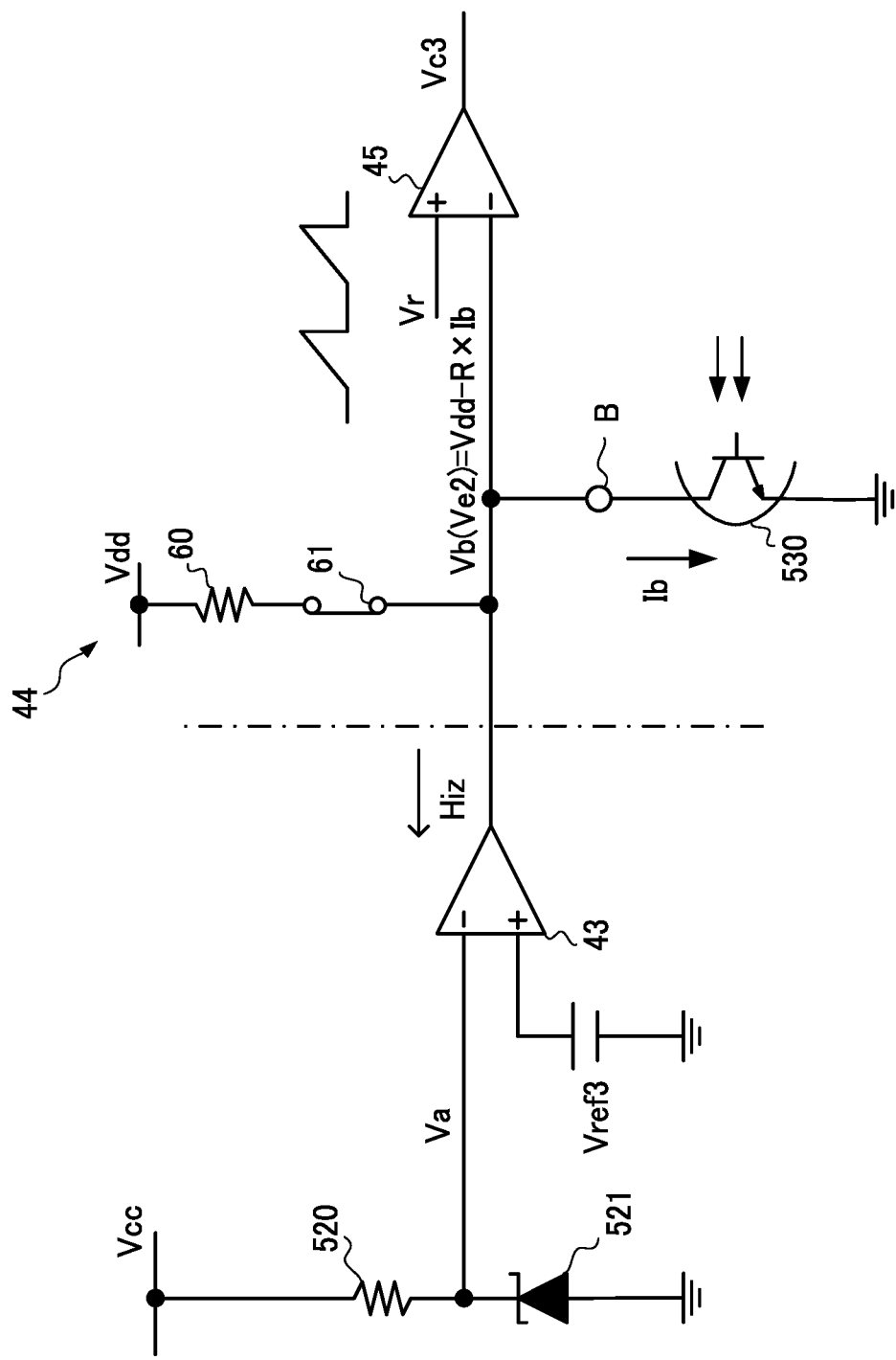
FIG. 9 is a diagram illustrating a configuration of part of a switching control IC 10.

As a result, in the switching control IC 10 in FIG. 1, only the error voltage output circuit 44 out of the error amplifier circuit 43 and the error voltage output circuit 44 operates, as illustrated in FIG. 9. Note that the output of the error amplifier circuit 43 is in a high-impedance state. Thus, the output of the error amplifier circuit 43 does not affect the voltage Vb at the terminal B.

In addition, when the signal ENB goes low at the time t24, the switch 61 of the error voltage output circuit 44 is turned on, and thus the error voltage Ve2 from the resistor 60 results in Ve2=Vdd−R×Ib, where "R" is the resistance value of the resistor 60, and "Ib" is the current value of the bias current Ib from the phototransistor 530. Further, since the on-resistance value of the switch 61 is sufficiently small, the voltage Vb at the terminal B results in the error voltage Ve2.

Figure 10:
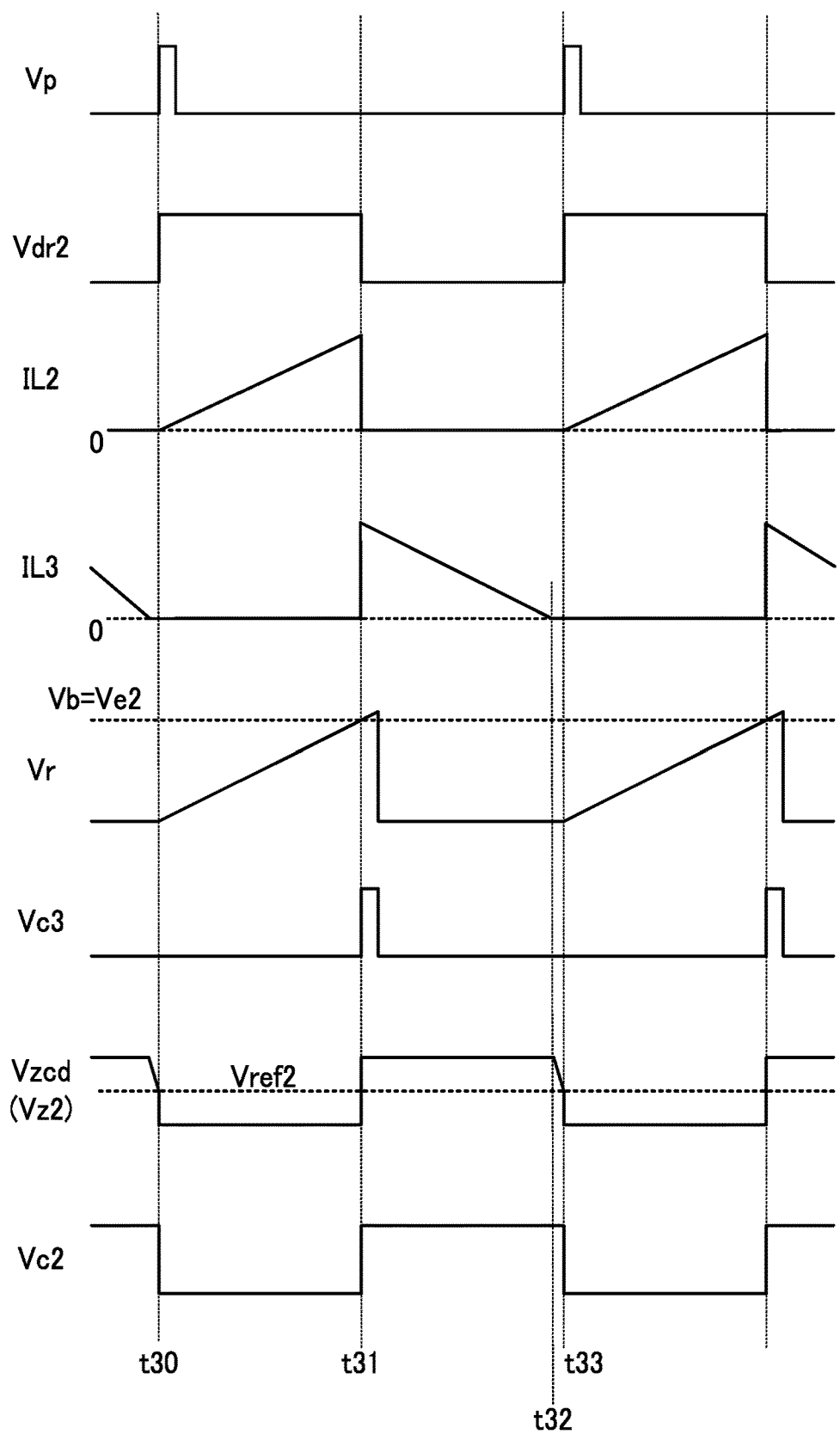
FIG. 10 is a diagram for explaining an operation of a power supply circuit 21.

FIG. 10 is a diagram for explaining an operation of the power supply circuit 21 after startup. Note that the timing of startup of the power supply circuit 21 is, for example, the time t24, at which the signal ENB goes low and circuits in the switching control IC 10 start operating.

Firstly, when the pulse signal Vp is outputted at a time t30, the drive signal Vdr2 goes high, thereby turning on the NMOS transistor 303. As a result, the inductor current IL2 increases. In addition, when the pulse signal Vp is outputted, the amplitude of the ramp wave Vr from the oscillator circuit 42 increases. When the NMOS transistor 303 is turned on, the diode 305 is off, since the secondary coil L11 is electromagnetically coupled with the opposite polarity, and thus energy is accumulated in the transformer 302.

Then, when the amplitude level of the ramp wave Vr becomes higher than the level of the voltage Vb (=Ve2) at a time t31, the comparator 45 changes the signal Vc3 to high. As a result, the SR flip-flop 70 is reset, and the signal Vdr2 goes low as well.

When the signal Vdr2 goes low, the NMOS transistor 303 is turned off. Then, the inductor current IL2 abruptly decreases. Thus, the polarity of the voltage Vz2 at one end of the auxiliary coil L12, having the other end grounded, becomes positive. In addition, the energy accumulated in the transformer 302 is outputted from the secondary coil L11 through the diode 305. As a result, the voltage Vzcd (=Vz2) becomes higher than the reference voltage Vref2, and thus the signal Vc2 from the comparator 40 goes high.

Then, when an inductor current IL3 through the secondary coil L11 becomes substantially zero at a time t32, the voltage Vz2 across the auxiliary coil L12 that is magnetically coupled to the main coil L10 starts dropping abruptly. As a result, at a time t33 and thereafter, the voltage Vzcd (=Vz2) becomes lower than the reference voltage Vref2, and thus the signal Vc2 from the comparator 40 goes low.

When the signal Vc2 goes low, the pulse signal Vp is outputted, thereby turning on the NMOS transistor 303. Then, at the time t33 and thereafter, the operations from the time t30 to the time t33 are repeated. Note that the timing at which the inductor current IL3 becomes substantially zero varies with the current value of the inductor current IL2. Accordingly, the switching control IC 10 turns on the NMOS transistor 303 based on the inductor current IL2.

==Feedback Control==

Here, when the load 11 becomes a light load, the output voltage Vout2 rises from the target level V2. At this time, the current flowing through the shunt regulator (not illustrated) of the constant voltage circuit 307 increases, and thus the current through the light emitting diode 308 increases as well. Then, the phototransistor 530 increases the bias current Ib according to the degree of amplification of the light from the light emitting diode 308, and thus the error voltage Ve2 (=Vb) drops. As a result, the time period during which the NMOS transistor 303 is on is shortened, and thus the output voltage Vout2 drops.

On the other hand, when the output voltage Vout2 drops from the target level V2, the current from the light emitting diode 308 decreases, contrary to the above. As a result, the bias current Ib decreases and the error voltage Ve2 (=Vb) rises. The time period during which the NMOS transistor 303 is on therefore becomes longer, and thus the output voltage Vout2 rises. As such, in the power supply circuit 21, the output voltage Vout2 is feedback-controlled so as to reach the target level V2. Accordingly, the switching control IC 10 enables the isolated power supply circuit 21 to perform a desired operation.

===Switching Control IC for Causing Power Supply Circuit to Perform Soft Start===

<<<Configuration of Switching Control IC 12>>>

Figure 11:
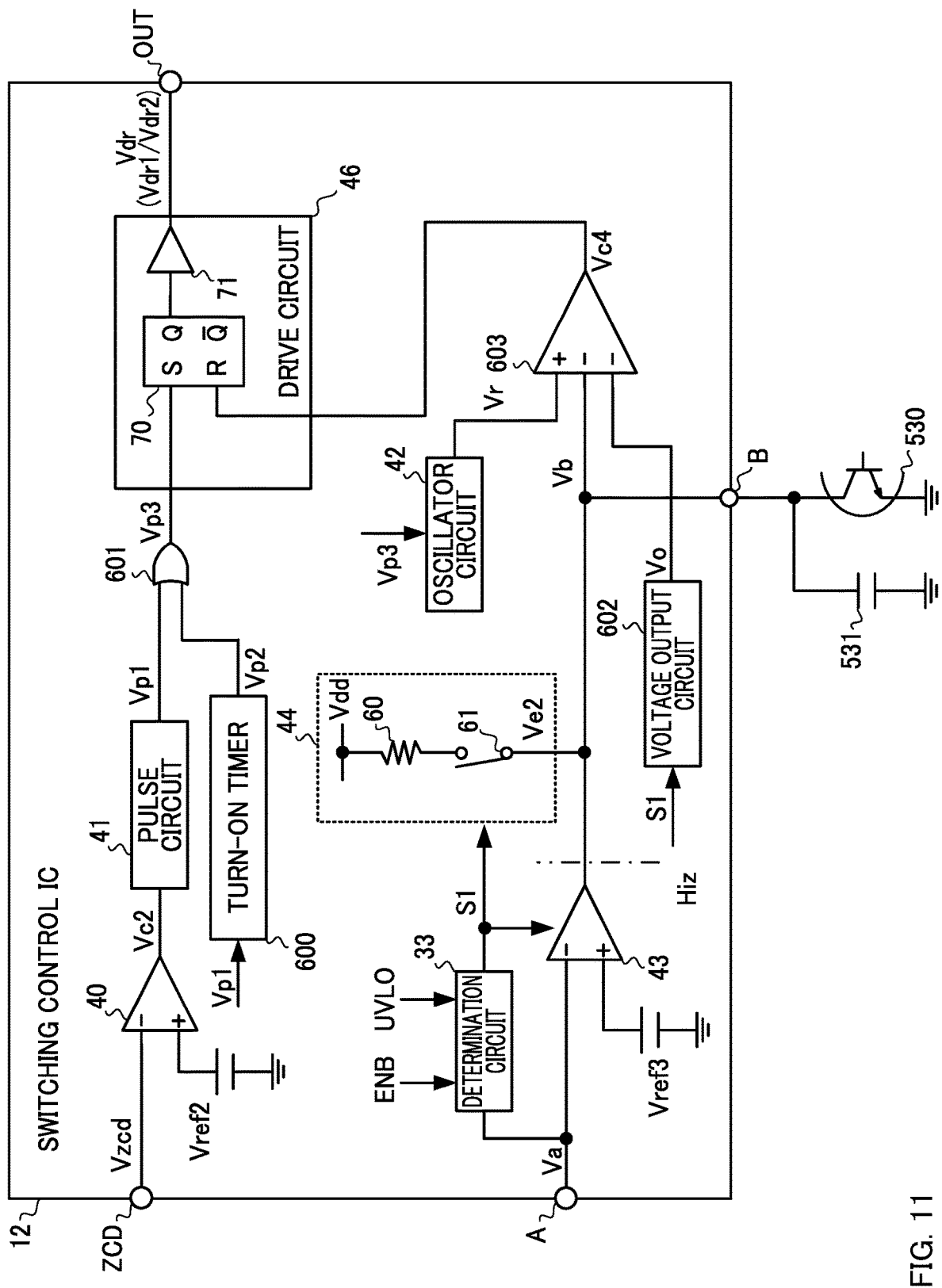
FIG. 11 is a diagram illustrating an example of a switching control IC 12.

FIG. 11 is a diagram illustrating an example of a switching control IC 12 that performs soft start of the power supply circuit upon startup of an isolated power supply circuit. Here, the "soft start" means reduction in flow of a large current through a transistor that is to be switched, upon startup of the power supply circuit. Further, in an embodiment of the present disclosure, "the switching control IC starts" means, for example, that the signal ENB in the switching control IC goes low and circuits in the switching control IC start operating.

The switching control IC 12 includes a turn-on timer 600, an OR circuit 601, and a voltage output circuit 602 in addition to the configuration of the switching control IC 10 in FIG. 1, and also includes a comparator 603 in place of the comparator 45. Note that, in an embodiment of the present disclosure, the circuits and elements that are the same are denoted by the same reference signs, and thus a description of, for example, some circuits and elements (e.g., the terminal VCC, the power supply circuit 30, and the voltage detection circuits 31 and 32) is omitted for convenience. Accordingly, circuits not included in the switching control IC 10 will be mainly described.

The turn-on timer 600 outputs a pulse signal Vp2 for turning on a switching transistor when the power supply circuit starts or when the AC voltage Vac is interrupted and no pulse signal Vp1 is outputted from the pulse circuit 41. Specifically, the turn-on timer 600 outputs a high pulse signal Vp2 at predetermined intervals in the case where the pulse signal Vp1 is not outputted for a predetermined time period.

The OR circuit 601 outputs a pulse signal Vp3 for turning on the switching transistor when one of the pulse signals Vp1 and Vp2 goes high.

Figure 12:
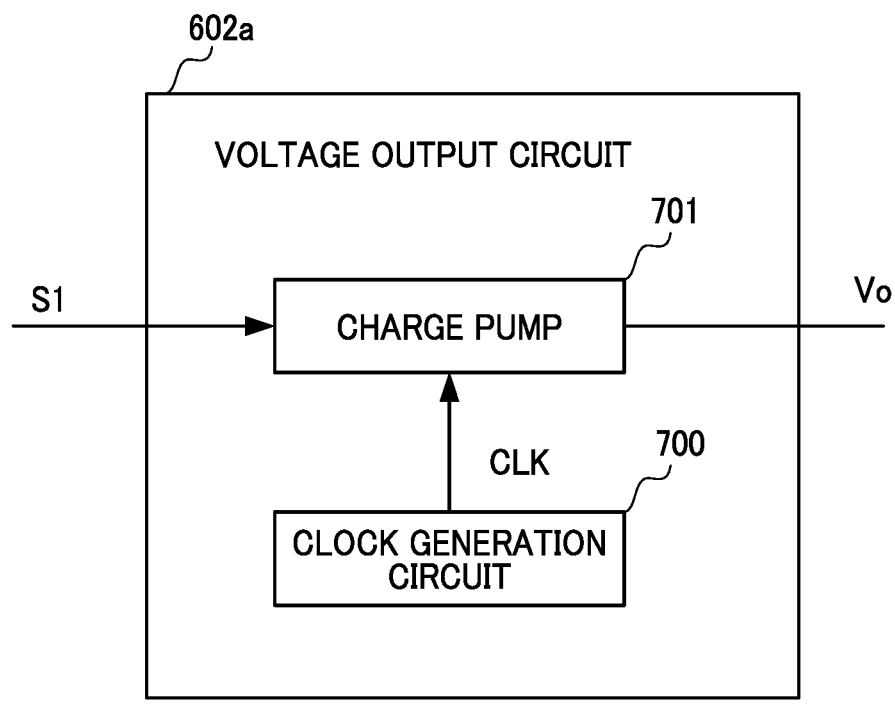

The voltage output circuit 602 outputs a voltage Vo whose level gradually rises, when receiving the high signal S1 indicating that the switching control IC 12 is determined as being used in an isolated power supply circuit. FIG. 12 is a diagram illustrating an example of a voltage output circuit 602a according to an embodiment of the voltage output circuit 602. The voltage output circuit 602a comprises a clock generation circuit 700 and a charge pump 701. Note that the voltage Vo outputted by the voltage output circuit 602 corresponds to a "first voltage".

The clock generation circuit 700 outputs a clock signal CLK having a predetermined frequency. The charge pump 701 generates the voltage Vo based on the clock signal CLK upon receiving the high signal S1. Specifically, when the signal S1 goes high, the charge pump 701 gradually raises the voltage Vo from 0 V to a predetermined voltage (e.g., the power supply voltage Vdd).

The comparator 603 is a so-called 3-input comparator that outputs the result of the comparison between the lower one of voltages applied to two inverting inputs thereof and a voltage applied to the non-inverting input thereof. Accordingly, the comparator 603 compares magnitudes between the lower one of the voltages Vb and Vo and the ramp wave Vr, and outputs the result of the comparison as a signal Vc4. Note that, although details will be described later, for example, a phototransistor 530 and a capacitor 531 are coupled to the terminal B, at which the voltage Vb is generated.

Note that, although details will be described later, the voltage output circuit 602 operates only when the switching control IC 12 is used in an isolated power supply circuit. Thus, a description will be given assuming that, for example, the phototransistor 530 and the capacitor 531 are coupled to the terminal B, at which the voltage Vb is generated.

Figure 13:
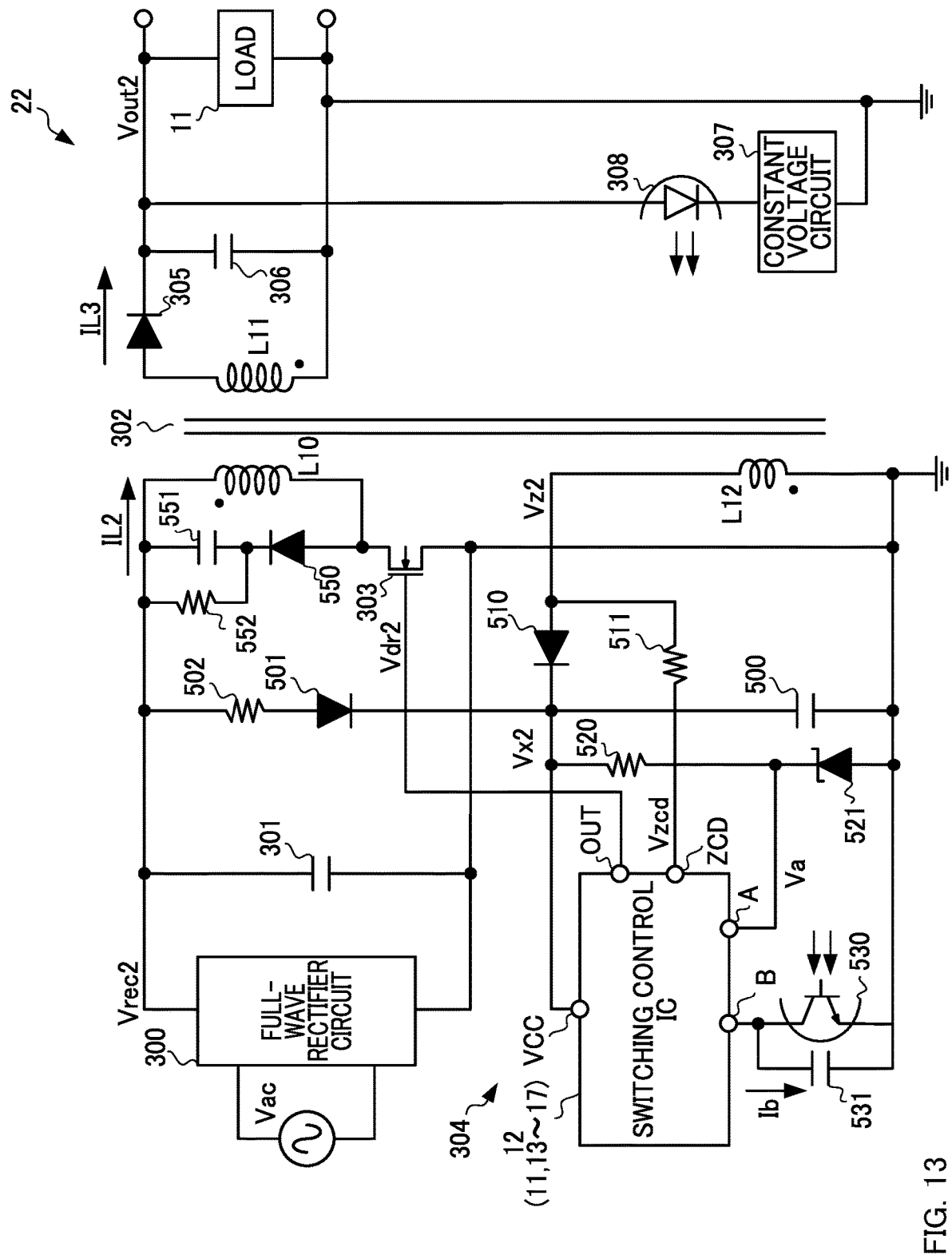
FIG. 13 is a diagram illustrating an example of a configuration of a power supply circuit 22.

FIG. 13 is a diagram illustrating an example of a configuration in the case where the switching control IC 12 is used in an isolated power supply circuit 22. As in the power supply circuit 21, the power supply circuit 22 is a flyback AC-DC converter that generates an output voltage Vout2 of a target level V2 (e.g., 15 V) at a load 11 from an AC voltage Vac of a commercial power supply. In addition to the elements and the like included in the power supply circuit 21, the power supply circuit 22 comprises the capacitor 531 coupled to the terminal B of the switching control IC 12, and a diode 550, a capacitor 551, and a resistor 552 that cause the current through the primary coil L10 to flow back thereinto.

The capacitor 531 is used when the switching control IC 12 performs a soft start operation, as well as removes noise generated at the terminal B.

The diode 550 is a diode that causes the current through the primary coil L10 to flow back thereinto when the NMOS transistor 303 is off. The capacitor 551 and the resistor 552 are coupled to the cathode of the diode 550. Thus, when the diode 550 is turned on, a current corresponding to the impedance of each of the capacitor 551 and the resistor 552 is returned into the primary coil L10.

Figure 14:
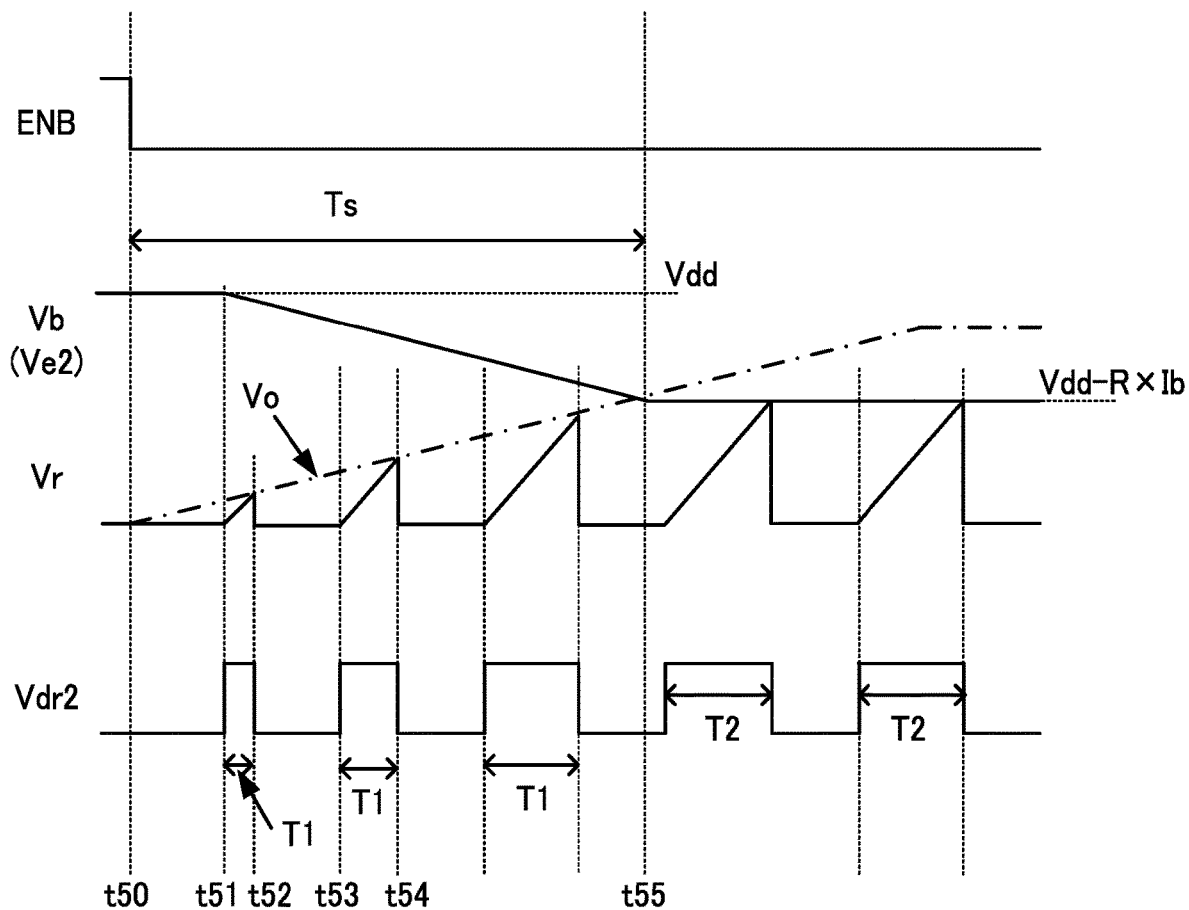
FIG. 14 is a diagram illustrating an example of waveforms upon startup of a power supply circuit 22.

FIG. 14 is a diagram illustrating an example of waveforms upon startup of the power supply circuit 22 that uses the switching control IC 12. Here, it is assumed, for example, that a time t50 in FIG. 14 is the timing at which the power supply voltage Vcc (=Vx2) has risen to the predetermined level Vt2 (the time t24 in FIG. 8). Note that, in FIG. 8, the voltage Vb at the terminal B immediately drops to Vdd−R× Ib at the time t24, at which the signal S1 goes high, for convenience. The actual voltage Vb gradually drops, for example, as illustrated in FIG. 14.

Firstly, at the time t50, when the signal ENB in the switching control IC 12 goes low and the switching control IC 12 starts, circuits in the switching control IC 12 start operating. Then, the determination circuit 33 in FIG. 11 outputs the high signal S1, thereby turning on the switch 61 of the error voltage output circuit 44. Note that, at this timing, power has not yet been sent to the secondary side of the power supply circuit 22, and thus the output voltage Vout2 is 0 V. Accordingly, the bias current Ib from the phototransistor 530 is zero, and the level of the voltage Vb results in the power supply voltage Vdd. Further, when the signal S1 goes high at the time t50, the voltage output circuit 602 raises the voltage Vo from 0 V.

Then, at a time t51, the turn-on timer 600 outputs the high pulse signal Vp2, and thus the pulse signal Vp3 goes high as well. As a result, the drive signal Vdr2 goes high, thereby turning on the NMOS transistor 303. Further, the oscillator circuit 42 outputs the ramp wave Vr, whose amplitude gradually increases, each time the high pulse signal Vp3 is inputted thereto. Accordingly, the amplitude of the ramp wave Vr increases at the timing of the time t51.

When the ramp wave Vr becomes higher than the voltage Vb (here, the voltage Vo) at a time t52, the comparator 603 outputs a high signal Vc4, and thus the drive signal Vdr2 goes low, thereby turning off the NMOS transistor 303.

Further, at a time t53, the turn-on timer 600 outputs the high pulse signal Vp2. As a result, the drive signal Vdr2 goes high and thereby turns on the NMOS transistor 303. Further, at this timing, the amplitude of the ramp wave Vr gradually increases. At a time t54, the comparator 603 outputs the high signal Vc4, and thus the drive signal Vdr2 goes low. Here, since the voltage output circuit 602 gradually raises the level of the voltage Vo from the time t50, a time period T1 during which the NMOS transistor 303 is on gradually increases as well. Accordingly, the power supply circuit 22 is soft-started.

Meanwhile, when the NMOS transistor 303 is switched and power is supplied to the secondary side of the power supply circuit 22, the level of the output voltage Vout2 gradually rises. As the level of the output voltage Vout2 becomes higher, the intensity of the light from the light emitting diode 308 becomes stronger as well, and thus the bias current Ib flowing via the terminal B increases as well. As a result, for example, the signal ENB goes low and when the NMOS transistor 303 starts switching, the error voltage Ve2 (=Vdd−R×Ib) drops. Then, from a time t55, at which the error voltage Ve2 becomes lower than the voltage Vo, and thereafter, the comparator 603 compares the magnitudes between the error voltage Ve2 and the ramp wave Vr and change the drive signal Vdr2 to low.

At the time t55 and thereafter, for example, the switching control IC 12 performs the foregoing operation in FIG. 10, and thus the output voltage Vout2 is controlled so as to reach the target level V2. Accordingly, the switching control IC 12 can therefore control the isolated power supply circuit 22 so as to perform a normal operation. As such, the switching control IC 12 can gradually increase the time period T1, during which the NMOS transistor 303 is on, in the time period from the time t50, at which the switching control IC 12 is started, to the time t55. Accordingly, the predetermined time period from the time t50 to the time t55 results in a so-called soft start period Ts.

Note that, in an embodiment of the present disclosure, a time period T2 (second time period) during which the NMOS transistor 303 is on after the soft start period Ts is longer than the time period T1 (first time period), during which the NMOS transistor 303 is on, in the soft start period Ts. Thus, in an embodiment of the present disclosure, it is possible to reliably prevent a large current from flowing through the NMOS transistor 303 when the power supply circuit 22 is started.

In addition, the charge pump 701 according to an embodiment of the present disclosure is designed to output the voltage Vo at the level of the power supply voltage Vdd upon receiving the low signal S1, for example. For this reason, in the case where the switching control IC 12 is used in a non-isolated power supply circuit, the comparator 603 results in comparing the voltage from the error amplifier circuit 43 and the voltage of the ramp wave Vr. Accordingly, the comparator 603 is not affected by the voltage output circuit 602a.

==Other Embodiments of Voltage Output Circuit==

Figure 15:
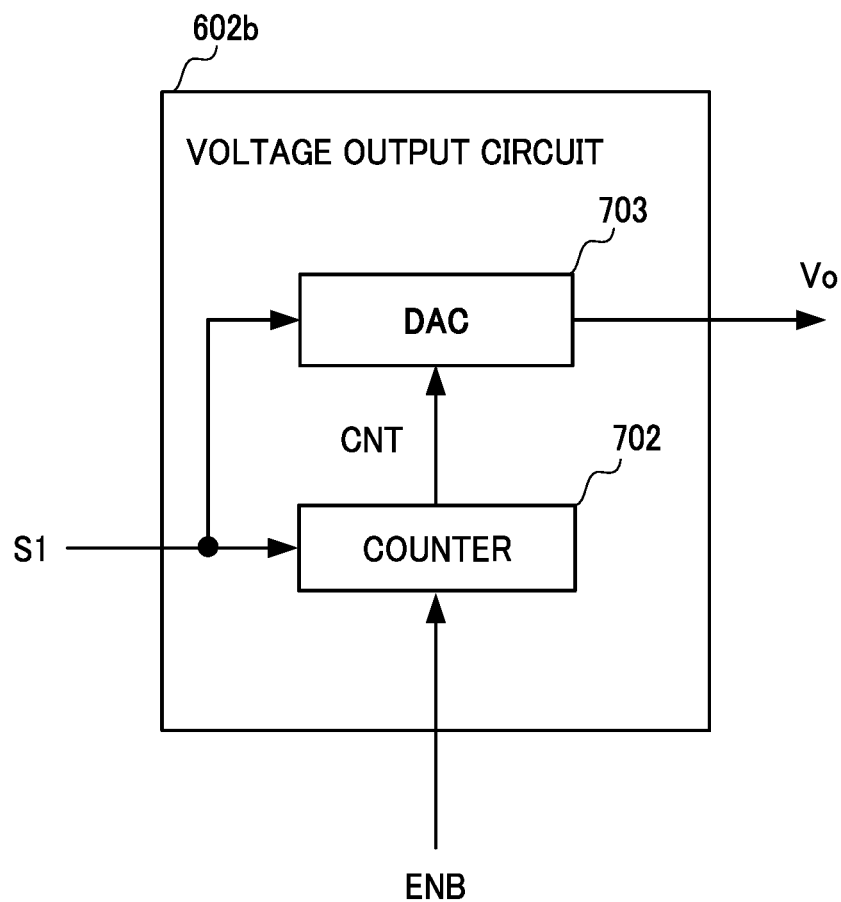
FIG. 15 is a diagram illustrating an example of a configuration of a voltage output circuit 602b.

FIG. 15 is a diagram illustrating an example of a configuration of a voltage output circuit 602b that outputs a voltage Vo changing discretely. The voltage output circuit 602b comprises a counter 702 and a digital-to-analog converter (DAC) 703.

The counter 702 is a circuit that increments a count value CNT by "1" at predetermined intervals in the soft start period Ts. Specifically, upon receiving the high signal S1, the counter 702 changes the count value CNT from "0" to "7" in the soft start period Ts (e.g., a time period of several ms to 10 ms). Note that reset of the counter 702 is released, when the signal ENB goes low, for example.

The DAC 703 is a circuit that outputs a voltage Vo whose level rises according to an increase in the count value CNT. For example, the DAC 703 outputs a voltage Vo of "0" V when the count value CNT is "0". Then, when the count value is incremented by "1", the DAC 703 increases the voltage Vo by "Vdd/7". As a result, the DAC 703 raises the voltage Vo to the power supply voltage Vdd when the count value CNT reaches "7". Thus, the power supply circuit can be soft-started by using the voltage output circuit 602b as such.

Note that the DAC 703 is designed to output the voltage Vo at the level of the power supply voltage Vdd upon receiving the low signal S1, irrespective of the count value CNT. Thus, in the case where the switching control IC 12 using the voltage output circuit 602b is used in a non-isolated power supply circuit, the comparator 603 is not affected by the voltage output circuit 602b.

Figure 16:
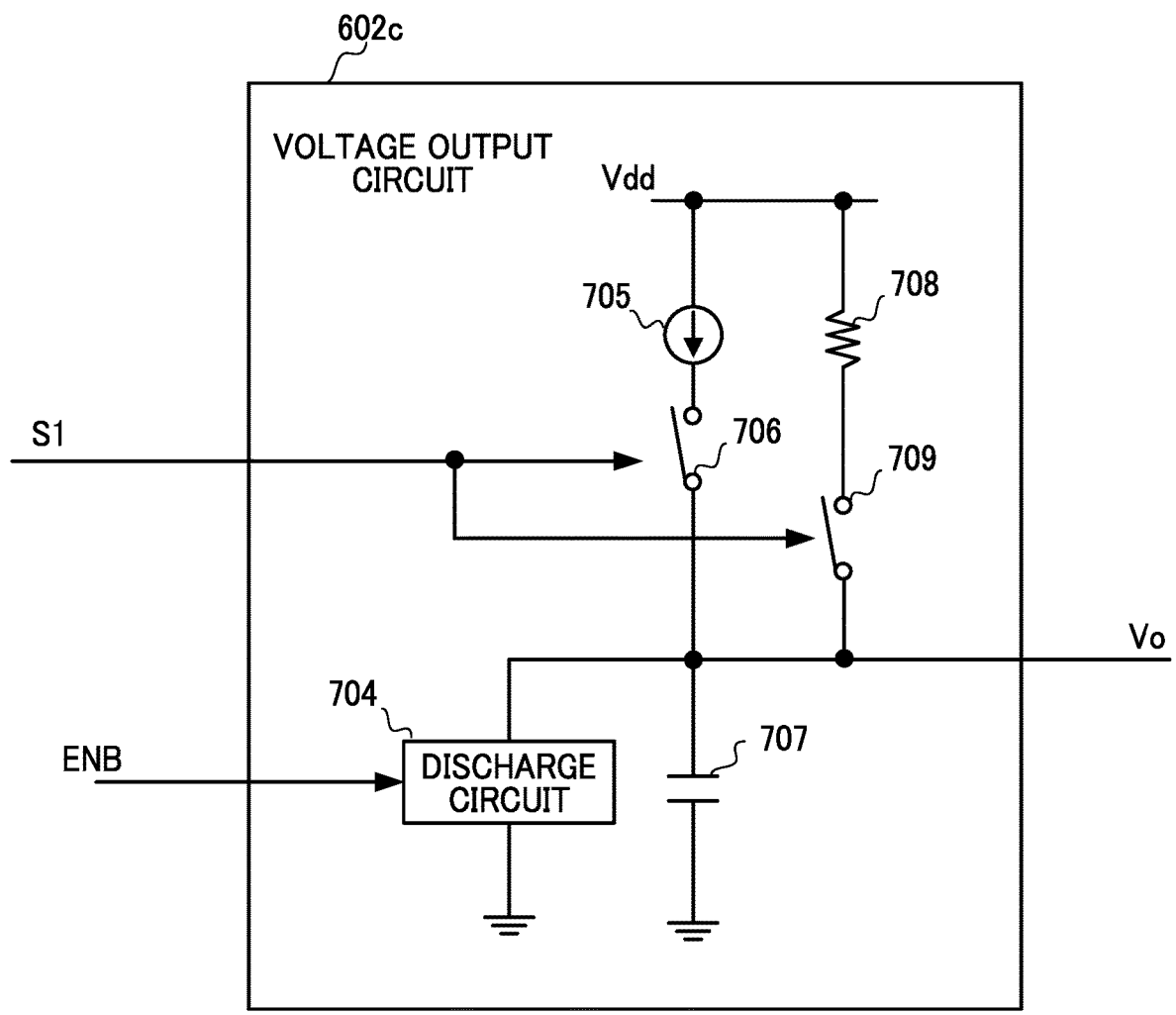
FIG. 16 is a diagram illustrating an example of a configuration of a voltage output circuit 602c.

FIG. 16 is a diagram illustrating an example of a configuration of a voltage output circuit 602c. The voltage output circuit 602c comprises a discharge circuit 704, switches 706 and 709, a current source 705, a capacitor 707, and a resistor 708.

The discharge circuit 704 performs an operation of discharging the capacitor 707 when the signal ENB is high, and stops the discharge operation when the signal ENB goes low.

The current source 705 charges the capacitor 707 with a predetermined current when the high signal S1 is inputted and the switch 706 is turned on. Here, a voltage Vo determined by the current from the current source 705 and the capacitance of the capacitor 707 is set so as to rise from 0 V to substantially the power supply voltage Vdd in the soft start period Ts, for example. Accordingly, the switching control IC 12 can soft-start a power supply circuit even in the case where the voltage output circuit 602c as such is used in place of the voltage output circuit 602a. Note that the switch 706 is turned off upon receiving the low signal S1.

The switch 709 is turned on upon receiving the low signal S1, and thus the voltage Vo across the capacitor 707 is pulled up to the power supply voltage Vdd via the resistor 708. Accordingly, in the case where the switching control IC 12 using the voltage output circuit 602c is used in a non-isolated power supply circuit, the comparator 603 is not affected by the voltage output circuit 602c.

Note that, in the switching control IC 12, the comparator 40, the pulse circuit 41, the turn-on timer 600, and the OR circuit 601 correspond to a "first timing signal output circuit", and the comparator 603 corresponds to a "second timing signal output circuit".

<<<Configuration of Switching Control IC 13>>>

Figure 17:
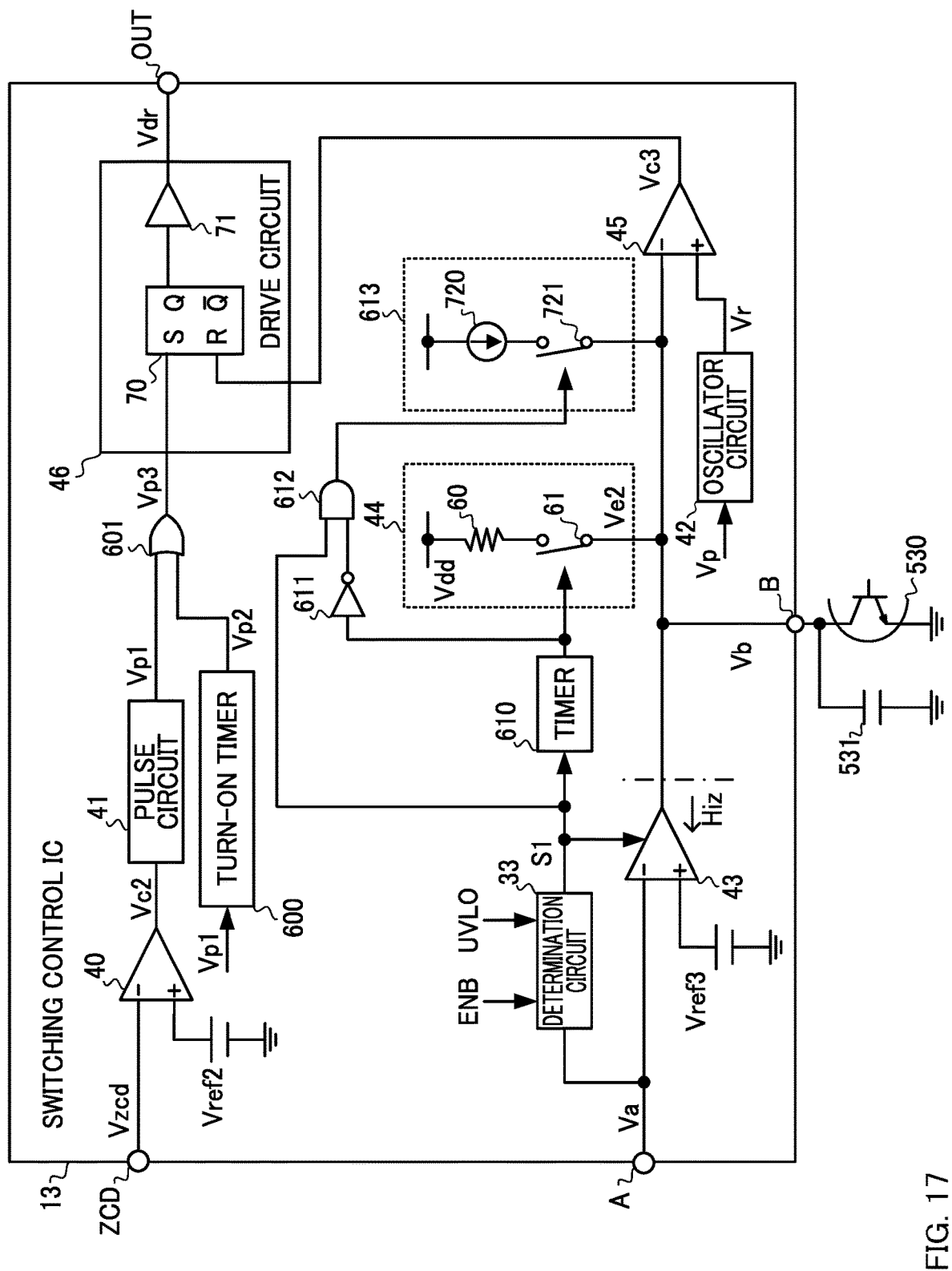
FIG. 17 is a diagram illustrating an example of a switching control IC 13.

FIG. 17 is a diagram illustrating an example of a switching control IC 13 that soft-starts an isolated power supply circuit. The switching control IC 13 is a circuit obtained by adding a turn-on timer 600, an OR circuit 601, a timer 610, an inverter 611, an AND circuit 612, and a charge circuit 613 to the switching control IC 10 in FIG. 1. The turn-on timer 600 and the like are the same as those in the foregoing circuit. Thus, in the following, the timer 610 and the like will be described.

The timer 610 starts measuring the time of the soft start period Ts upon receiving the high signal S1, which indicates that the switching control IC 13 is used in an isolated power supply circuit. Then, the timer 610 changes its output from low to high upon finishing measuring the time of the soft start period Ts after the input of the high signal S1. Note that the timer 610 outputs a low signal upon receiving the low signal S1, which indicates that the switching control IC 13 is used in a non-isolated power supply circuit.

The inverter 611 inverts the logic level of the output of the timer 610. The AND circuit 612 calculates the logical product of the signal S1 and the output of the inverter 611, and outputs the resultant to the charge circuit 613. The AND circuit 612 according to an embodiment of the present disclosure outputs a high signal until the soft start period Ts has elapsed since the signal S1 goes high, and outputs a low signal after a lapse of the soft start period Ts.

The charge circuit 613 charges an element coupled to the terminal B (e.g., the capacitor 531) in the time period during which the AND circuit 612 outputs the high signal, and comprises a current source 720 that generates a predetermined current and a switch 721.

The switch 721 is turned on when the received signal from the AND circuit 612 goes high, and is turned off when the signal goes low. Thus, in an embodiment of the present disclosure, the charge circuit 613 operates until the soft start period Ts has elapse since the signal S1 goes high, and the error voltage output circuit 44 operates after a lapse of the soft start period Ts.

In the case where the switching control IC 13 as such is used in the power supply circuit 22 in FIG. 13, the capacitor 531 is charged with the current from the current source 720 and thus the voltage Vb gradually rises until the soft start period Ts has elapsed since the signal S1 goes high. Accordingly, in this time period, the comparator 45 compares the magnitudes between the voltage Vb that gradually increases and the ramp wave Vr, and thus the time period during which the NMOS transistor 303 is on gradually increases.

Then, when the soft start period Ts has elapsed, the voltage Vb reaches the error voltage Ve2. Thus, the comparator 45 compares the magnitudes between the ramp wave Vr and the voltage Vb determined by the error voltage Ve2. Accordingly, for example, the switching control IC 13 performs the foregoing operation in FIG. 10, and thus the output voltage Vout2 is controlled so as to reach the target level V2.

Note that, in the switching control IC 13, the comparator 40, the pulse circuit 41, the turn-on timer 600, and the OR circuit 601 correspond to the "first timing signal output circuit". Further, the timer 610, the inverter 611, the AND circuit 612, and the charge circuit 613 correspond to a "voltage output circuit", and the comparator 45 corresponds to the "second timing signal output circuit".

<<<Configuration of Switching Control IC 14>>>

Figure 18:
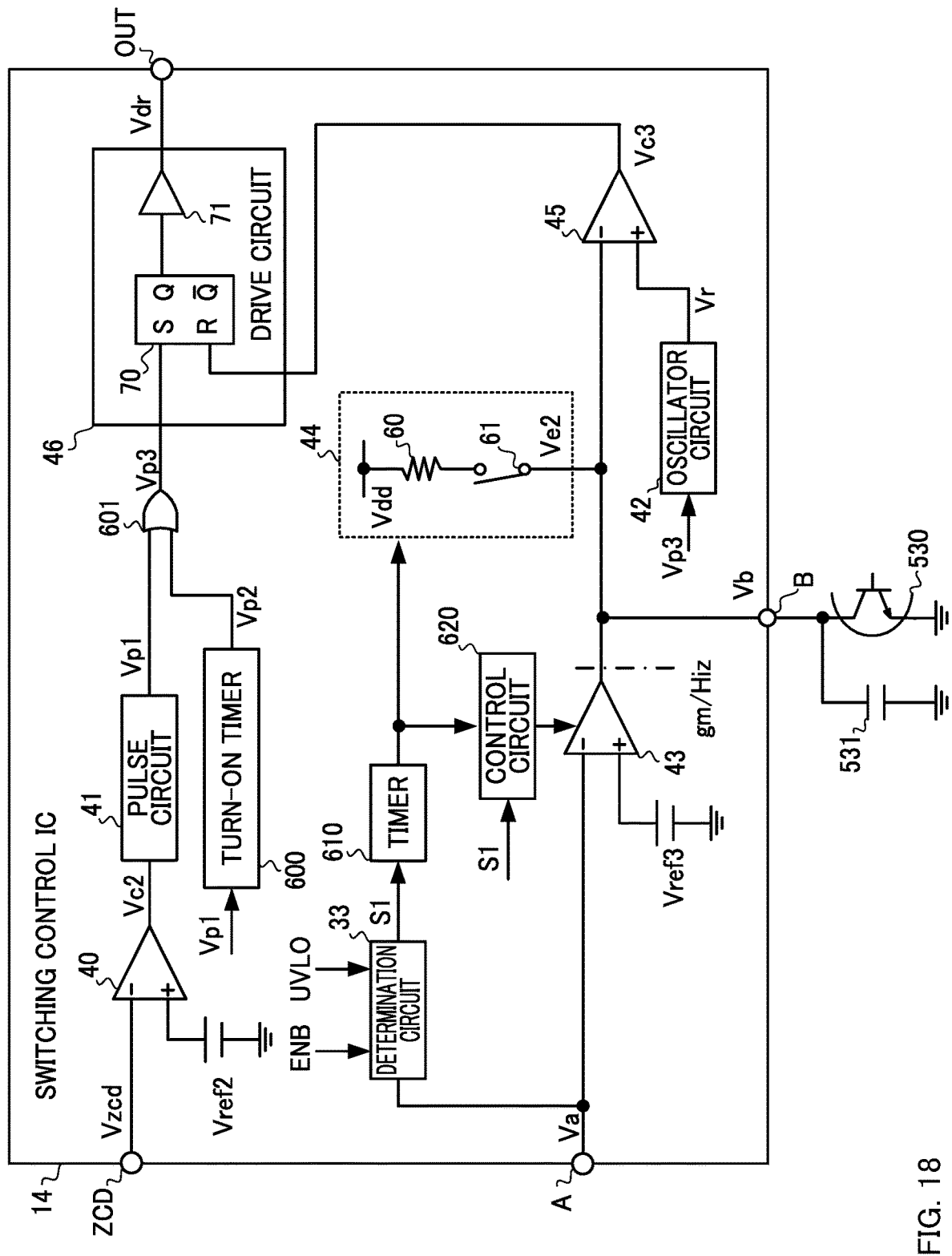
FIG. 18 is a diagram illustrating an example of a switching control IC 14.

FIG. 18 is a diagram illustrating an example of a switching control IC 14 that soft-starts an isolated power supply circuit. The switching control IC 14 is a circuit obtained by adding a turn-on timer 600, an OR circuit 601, a timer 610, and a control circuit 620 to the switching control IC 10 in FIG. 1. The turn-on timer 600 and the like are the same as those in the foregoing circuits. Accordingly, in the following, the control circuit 620 will be described.

The control circuit 620 causes the error amplifier circuit 43 to operate as a constant current source only during the soft start period Ts in the case where the switching control IC 14 is used in an isolated power supply circuit. Specifically, the control circuit 620 controls the error amplifier circuit 43, which is a transconductance amplifier, based on the signal S1 and the output of the timer 610. For example, in the case where the signal S1 is high, the control circuit 620 causes the error amplifier circuit 43 to output a predetermined current until the soft start period Ts has elapsed since the signal S1 goes high. Then, when the soft start period Ts has elapsed since the signal S1 goes high, the control circuit 620 causes the output of the error amplifier circuit 43 to be in a high-impedance state. On the other hand, in the case where the signal S1 is low, the control circuit 620 causes the error amplifier circuit 43 to output the error voltage Ve1.

With the use of the control circuit 620 as such, the error amplifier circuit 43 can gradually raise the voltage Vb in the soft start period Ts. In this time period, the comparator 45 compares the magnitudes between the voltage Vb that gradually increases and the ramp wave Vr, and thus the power supply circuit 22 is soft-started upon startup.

Note that, in the switching control IC 14, the comparator 40, the pulse circuit 41, the turn-on timer 600, and the OR circuit 601 correspond to the "first timing signal output circuit". Further, the timer 610, the control circuit 620, and the error amplifier circuit 43 correspond to the "voltage output circuit", and the comparator 45 corresponds to the "second timing signal output circuit".

<<<Configuration of Switching Control IC 15>>>

Figure 19:
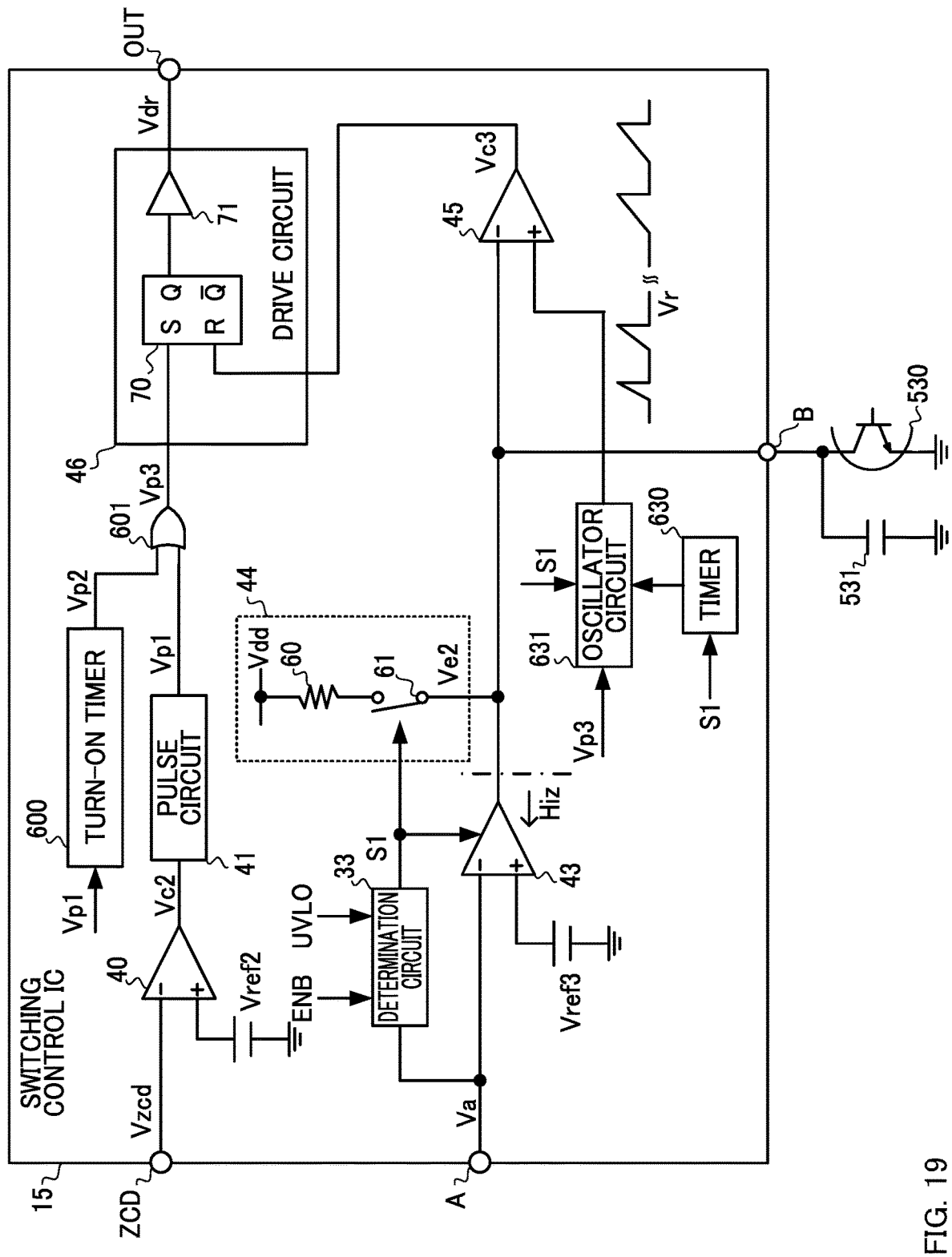
FIG. 19 is a diagram illustrating an example of a switching control IC 15.

FIG. 19 is a diagram illustrating an example of a switching control IC 15 that soft-starts an isolated power supply circuit. The switching control IC 15 is a circuit obtained by adding a turn-on timer 600, an OR circuit 601, a timer 630, and an oscillator circuit 631 to the switching control IC 10 in FIG. 1. The turn-on timer 600 and the OR circuit 601 are the same as those in the foregoing circuits. Accordingly, in the following, the timer 630 and the oscillator circuit 631 will be mainly described.

The timer 630 starts measuring the time of the soft start period Ts in the case where the signal S1 is high and the switching control IC 15 is used in an isolated power supply circuit. In the case where the signal S1 is high, the oscillator circuit 631 outputs a ramp wave Vr having a slope corresponding to the output of the timer 630 each time the pulse signal Vp3 is inputted thereto. Specifically, the oscillator circuit 631 outputs a ramp wave Vr having a triangular waveform whose slope becomes gradually gentler (or smaller) in the soft start period Ts. Then, when the soft start period Ts has elapsed since the signal S1 goes high, the oscillator circuit 631 stops making the slope of the ramp wave Vr gentler and outputs a ramp wave Vr having a predetermined slope.

On the other hand, in the case where the signal S1 is low and the switching control IC 15 is used in a non-isolated power supply circuit, the oscillator circuit 631 outputs a predetermined ramp wave Vr each time the pulse signal Vp3 is inputted thereto, irrespective of the output of the timer 630. Meanwhile, the drive circuit 46 turns off the switching transistor (e.g., the NMOS transistor 303) when the ramp wave Vr becomes higher than the voltage Vb. Accordingly, as the slope of the ramp wave Vr from the oscillator circuit 631 becomes gentler, the time period during which the switching transistor is on gradually increases. Thus, with the use of the oscillator circuit 631 as such, the switching control IC 15 can soft-start an isolated power supply circuit.

Note that, in the switching control IC 15, the comparator 40, the pulse circuit 41, the turn-on timer 600, and the OR circuit 601 correspond to the "first timing signal output circuit", and the comparator 45 corresponds to the "second timing signal output circuit".

<<<Configuration of Switching Control IC 16>>>

Figure 20:
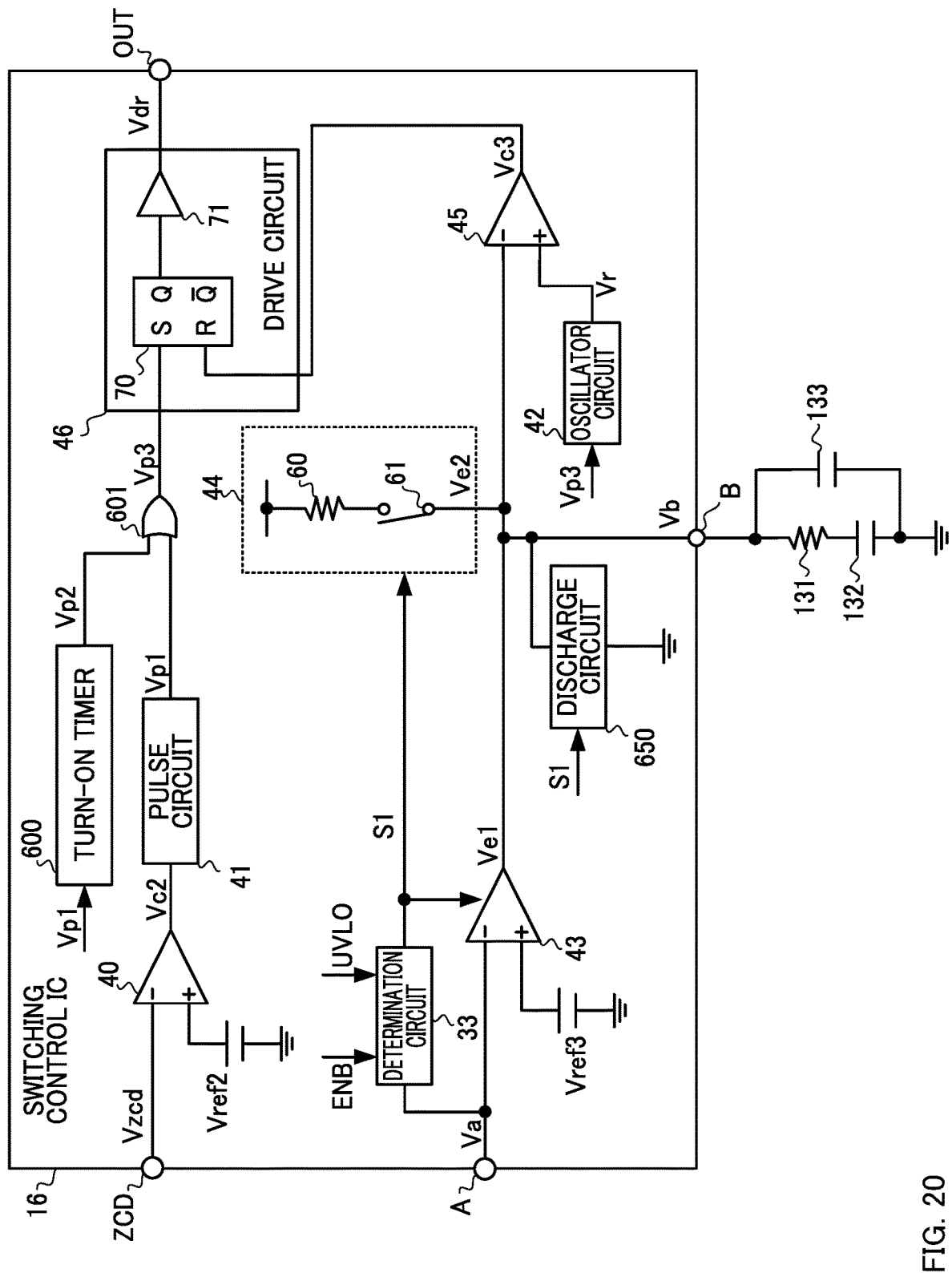
FIG. 20 is a diagram illustrating an example of a switching control IC 16.

FIG. 20 is a diagram illustrating an example of a switching control IC 16 that soft-starts a non-isolated power supply circuit. The switching control IC 16 is a circuit obtained by adding a turn-on timer 600, an OR circuit 601, and a discharge circuit 650 to the switching control IC 10 in FIG. 1. The turn-on timer 600 and the OR circuit 601 are the same as those in the foregoing circuits. Thus, in the following, the discharge circuit 650 will be described. Here, it is assumed that the switching control IC 16 is used in the power supply circuit 20 illustrated in FIG. 3, for example.

When the switching control IC 16 starts and, when receiving the low signal S1, which indicates that the switching control IC 16 is used in a non-isolated power supply circuit, for example, the discharge circuit 650 discharges, for a certain time period, the capacitors 132 and 133 that are coupled to the terminal B. As a result, the voltage Vb drops to 0 V.

Thereafter, when the error amplifier circuit 43 charges the capacitors 132 and 133, the voltage Vb gradually rises from 0 V. Thus, the time period during which the NMOS transistor 108, which is the switching transistor, is on gradually increases as well. Accordingly, with the use of such a configuration, the switching control IC 16 can soft-start the non-isolated power supply circuit 20.

===Switching Control IC Including Mask Circuit===

<<<Configuration of Switching Control IC 17>>>

For example, in the power supply circuits 20 and 21 in FIGS. 3 and 7, when the switching transistor is turned off and the current flowing through the transformers 103 and 302 changes, noise may be generated at the terminal ZCD. In such a case, the comparator 40 of the switching control IC 10 in FIG. 1 might change the signal Vc2 to high due to the noise at the terminal ZCD. Then, if the signal Vc2 goes high due to the noise, the switching control IC 10 results in turning on the switching transistor at wrong timing. Here, the switching transistor is, for example, the NMOS transistor 108, 303.

Figure 21:
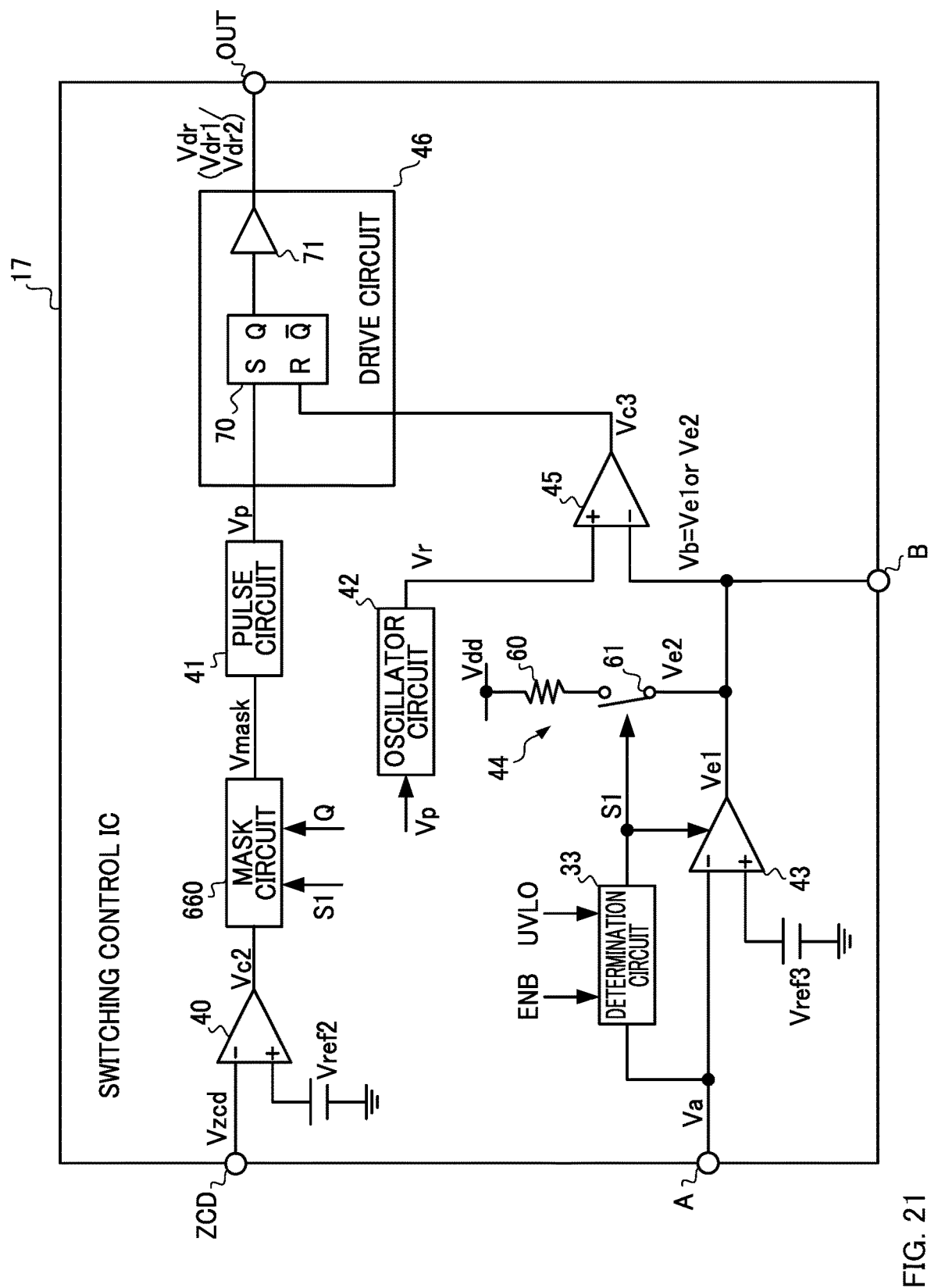
FIG. 21 is a diagram illustrating an example of a switching control IC 17.

FIG. 21 is a diagram illustrating an example of a switching control IC 17 capable of turning on a switching transistor at accurate timing. The switching control circuit IC 17 comprises a mask circuit 660 in addition to the configuration of the switching control IC 10 in FIG. 1.

The mask circuit 660 masks and outputs the signal Vc2 from the comparator 40 for a predetermined time period corresponding to the configuration of the power supply circuit after the switching transistor is turned off. Specifically, the mask circuit 660 masks the signal Vc2 for a mask period Tm1 in the case where the switching control IC 17 is used in a non-isolated power supply circuit, and masks the signal Vc2 for a mask period Tm2 (>Tm1) in the case where the switching control IC 17 is used in an isolated power supply circuit.

Figure 22:
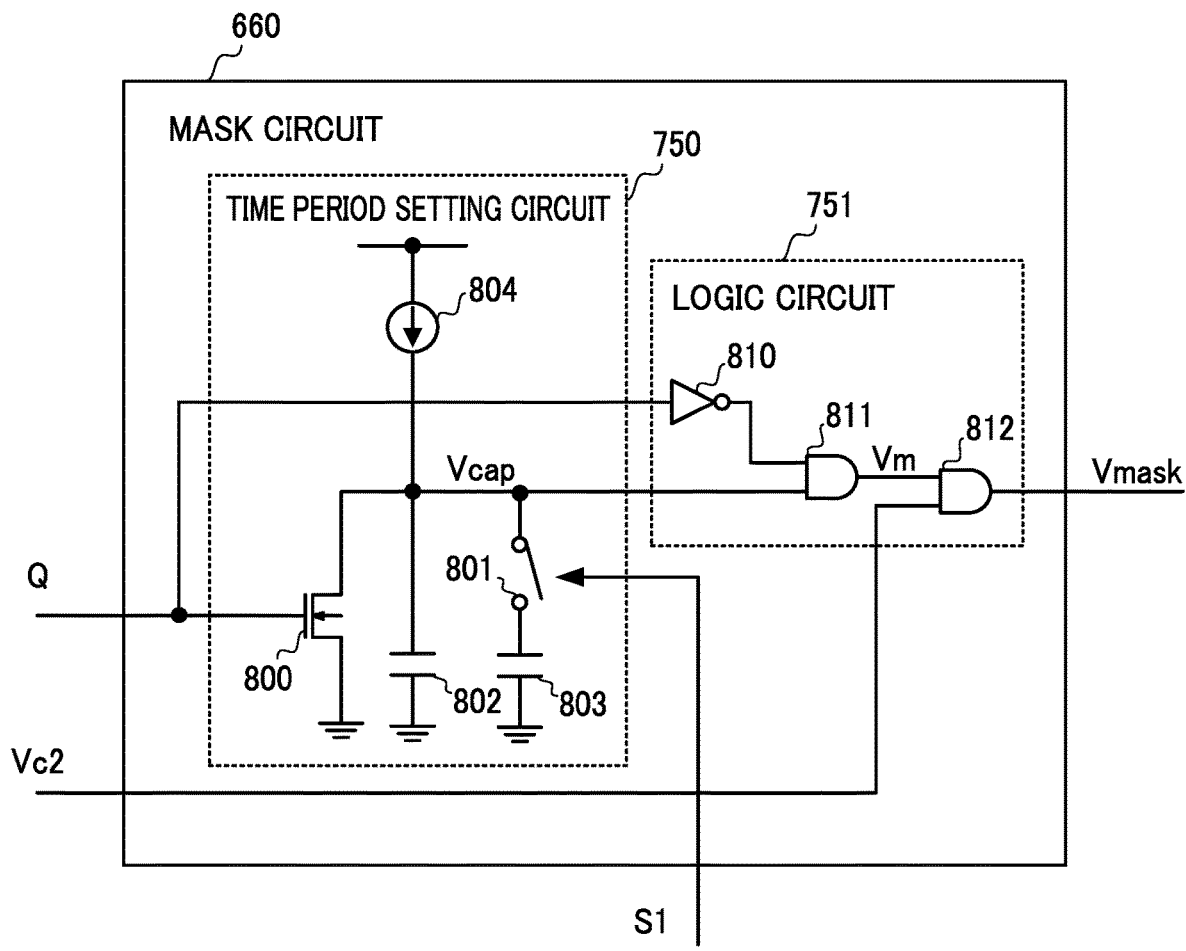
FIG. 22 is a diagram illustrating an example of a mask circuit 660.

As illustrated in FIG. 22, the mask circuit 660 comprises a time period setting circuit 750 and a logic circuit 751. The time period setting circuit 750 is a circuit for setting a mask period corresponding to the signal S1, and comprises an NMOS transistor 800, a switch 801, capacitors 802 and 803, and a current source 804.

The NMOS transistor 800 is turned on when the Q output of the SR flip-flop 70 included in the drive circuit 46 goes high, and is turned off when the Q output goes low. The switch 801 is turned on upon receiving the high signal S1, which indicates that the switching control IC 17 is used in an isolated power supply circuit, and is turned off upon receiving the low signal S1, which indicates that the switching control IC 17 is used in a non-isolated power supply circuit.

Accordingly, a voltage Vcap at a node at which the capacitor 802 and the current source 804 are coupled rises while the NMOS transistor 800 is off. In an embodiment of the present disclosure, a time period from when the Q output of the SR flip-flop 70 goes low to when the voltage Vcap becomes high in a state where the switch 801 is off will be referred to as the "mask period Tm1 (first mask period)". In addition, a time period from when the Q output of the SR flip-flop 70 goes low to when the voltage Vcap becomes high in a state where the switch 801 is on will be referred to as the "mask period Tm2 (second mask period)". Note that the mask period Tm2 in the state where the switch 801 is on is longer than the mask period Tm1.

The logic circuit 751 masks the signal Vc2 for the mask period Tm1, Tm2, and comprises an inverter 810 and AND circuits 811 and 812. Here, when the Q output of the SR flip-flop 70 is low, the output of the inverter 810 is high. Accordingly, the AND circuit 811 outputs a low signal Vm from when the switching transistor is turned off until when the voltage Vcap becomes high. Thus, during this time period, the AND circuit 812 outputs a low signal Vmask irrespective of the level of the signal Vc2. Whereas, when the voltage Vcap becomes high, the signal Vm goes high as well, and thus the AND circuit 812 can output a signal Vmask having the same logic level as the logic level of the signal Vc2.

<<<Operation of Switching Control IC 17>>>

==Case Where Switching Control IC 17 is Used in Non-Isolated Power Supply Circuit==

Figure 23:
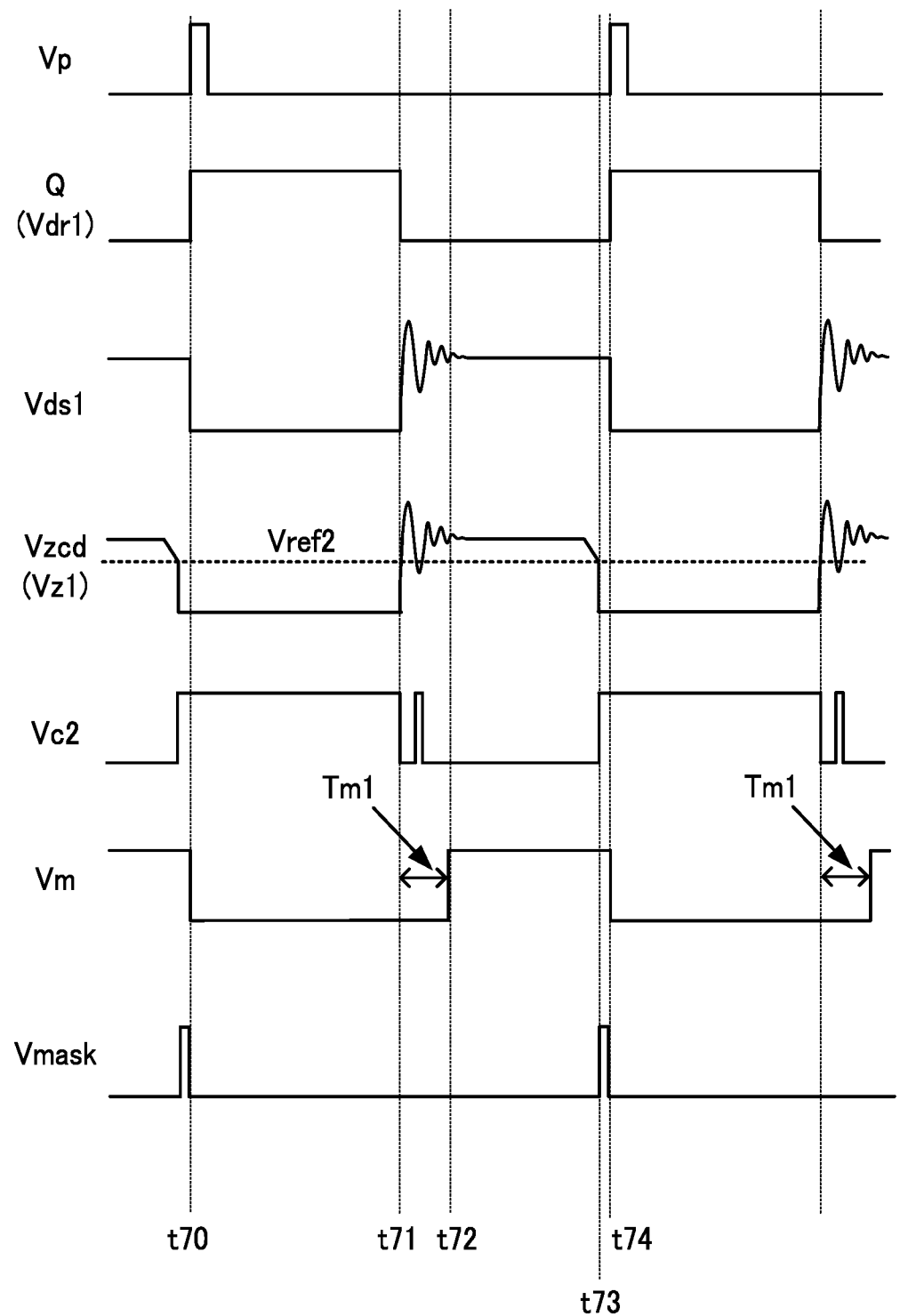
FIG. 23 is a diagram for explaining an operation of a power supply circuit 20.

FIG. 23 is a diagram for explaining an operation in the case where the switching control IC 17 is used in the non-isolated power supply circuit 20 in FIG. 3. Note that the operations of the basic circuits in the switching control IC 17 when it is used in a non-isolated power supply circuit have been explained in FIG. 6. Accordingly, in the following, the operations of circuits related to the mask circuit 660 will be mainly described.

When the pulse circuit 41 outputs the high pulse signal Vp at a time t70, the Q output of the SR flip-flop 70 goes high, thereby turning on the NMOS transistor 108 in FIG. 3. As a result, a voltage Vds1 between the drain and the source of the NMOS transistor 108 becomes substantially zero. Further, at this timing, the voltage Vzcd (=Vz1) is lower than the reference voltage Vref2, and thus the comparator 40 outputs the high signal Vc2.

However, at the time t70, the Q output of the SR flip-flop 70 is high, and thus the NMOS transistor 800 of the mask circuit 660 in FIG. 22 is turned on. Accordingly, both the signal Vm and the signal Vmask of the mask circuit 660 go low.

When the Q output of the SR flip-flop 70 goes low in response to the signal Vc3 from the comparator 45 at a time t71, the NMOS transistor 108 is turned off. As a result, the voltage Vds1 and the voltage Vzcd change to high. Meanwhile, when the NMOS transistor 108 is turned off, the diode 107 is turned on and the current flowing through the NMOS transistor 108 decreases abruptly. As a result, ringing noise occurs in the voltage Vds1 and the voltage Vzcd.

When the ringing noise occurs in the voltage Vzcd and the voltage Vzcd becomes lower than the reference voltage Vref2, the signal Vc2 goes high. However, the signal Vm is low from the time t71, at which the NMOS transistor 108 is turned off, to the time t72, at which the mask period Tm1 has elapsed. Accordingly, from the time t71 to the time t72, the signal Vc2 is masked and the mask circuit 660 continues to output the low signal Vmask. Note that the signal Vm goes high at the time t72, at which the mask period Tm1 has elapsed from the time t71.

Then, when the inductor current IL1 becomes substantially zero at a time t73, the voltage Vz1 across the auxiliary coil L2 magnetically coupled to the main coil L1 drops abruptly. As a result, at the time t73, the voltage Vzcd becomes lower than the reference voltage Vref2, and thus the signal Vc2 from the comparator 40 goes high. At this timing, since the signal Vm is high, the signal Vmask goes high as well. As a result, at a time t74, the pulse circuit 41 outputs the high pulse signal Vp, thereby turning on the NMOS transistor 108. At this time and thereafter, the operations from the time t70 to the time t74 are repeated.

As such, the mask circuit 660 according to an embodiment of the present disclosure can mask the signal Vc2 during a time period from the time t71, at which the NMOS transistor 108 is turned off, to the time t72, at which the mask period Tm1 has elapsed. Accordingly, the switching control IC 17 can turn on the NMOS transistor 108 at desired timing, irrespective of the ringing noise.

==Case Where Switching Control IC 17 is Used in Isolated Power Supply Circuit==

Figure 24:
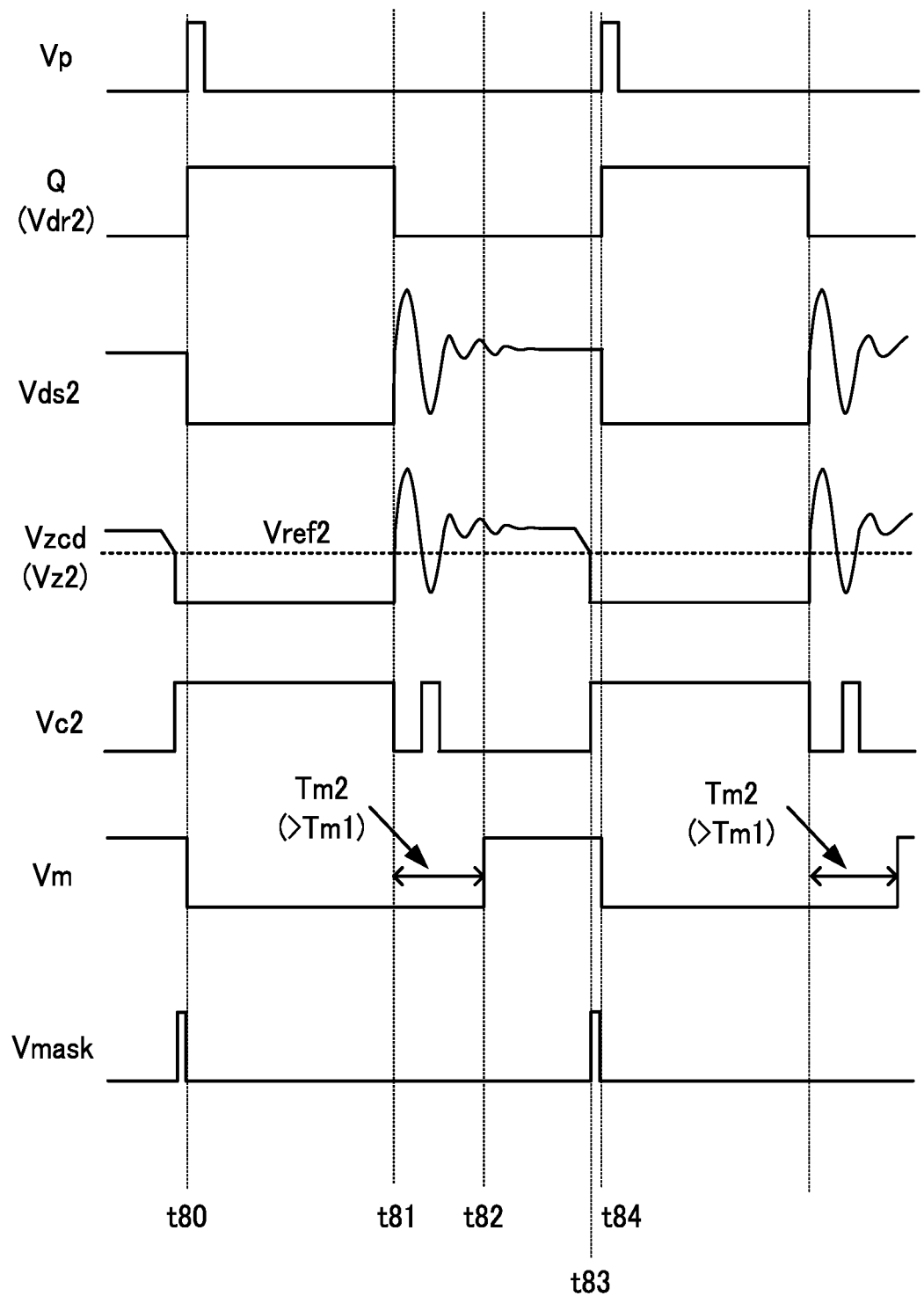
FIG. 24 is a diagram for explaining an operation of a power supply circuit 22.

FIG. 24 is a diagram for explaining an operation in the case where the switching control IC 17 is used in the isolated power supply circuit 22 in FIG. 13. Note that the operations of the basic circuits in the switching control IC 17 when it is used in an isolated power supply circuit have been explained in FIG. 10. Accordingly, in the following, the operations of circuits related to the mask circuit 660 will be mainly described.

When the pulse circuit 41 outputs the high pulse signal Vp at a time t80, the Q output of the SR flip-flop 70 goes high, thereby turning on the NMOS transistor 303 in FIG. 13. As a result, a voltage Vds2 between the drain and the source of the NMOS transistor 303 becomes substantially zero. Further, at this timing, the voltage Vzcd (=Vz2) is lower than the reference voltage Vref2, and thus the comparator 40 outputs the high signal Vc2.

However, at the time t80, the Q output of the SR flip-flop 70 is high, and thus the NMOS transistor 800 of the mask circuit 660 in FIG. 22 is turned on. Accordingly, both the signal Vm and the signal Vmask of the mask circuit 660 go low.

When the Q output of the SR flip-flop 70 goes low at a time t81, the NMOS transistor 303 is turned off. As a result, the voltage Vds2 and the voltage Vzcd change to high. Meanwhile, when the NMOS transistor 303 is turned off, the energy in the primary coil L10 is sent to the secondary coil L11 on the secondary side as well as flows back into the primary coil L10 via the diode 550, the capacitor 551, and the resistor 552. As a result, in the isolated power supply circuit 22, the current flowing through the NMOS transistor 303 decreases abruptly when the NMOS transistor 303 is turned off. Further, in an embodiment of the present disclosure, the change in the current through the NMOS transistor 303 in FIG. 13 when it is turned off is greater than the change in the current through the NMOS transistor 108 in FIG. 3 when it is turned off. As a result, a very large ringing noise occurs in the voltage Vds2 and the voltage Vzcd.

When the ringing noise occurs in the voltage Vzcd and the voltage Vzcd becomes lower than the reference voltage Vref2, the signal Vc2 goes high. However, the signal Vm is low from the time t81, at which the NMOS transistor 303 is turned off, to the time t82, at which the mask period Tm2 has elapsed. Accordingly, during a time period from the time t81 to the time t82, the signal Vc2 is masked and the mask circuit 660 continues to output the low signal Vmask. Note that the signal Vm goes high at the time t82, at which the mask period Tm2 has elapsed from the time t81.

Then, when the current flowing through the auxiliary coil L12 becomes substantially zero at a time t83, the voltage Vz2 across the auxiliary coil L12 drops abruptly. As a result, at the time t83, the voltage Vzcd becomes lower than the reference voltage Vref2, and thus the signal Vc2 from the comparator 40 goes high. At this timing, since the signal Vm is high, the signal Vmask goes high as well. As a result, at a time t84, the pulse circuit 41 outputs the high pulse signal Vp, thereby turning on the NMOS transistor 303. At this time and thereafter, the operations from the time t80 to the time t84 are repeated.

As such, the mask circuit 660 according to an embodiment of the present disclosure can mask the signal Vc2 from the time t81, at which the NMOS transistor 303 is turned off, to the time t82, at which the mask period Tm2 has elapsed. Accordingly, the switching control IC 17 can turn on the NMOS transistor 303 at desired timing, irrespective of the ringing noise.

Note that, in the switching control IC 17, the comparator 40, which outputs the signal Vc2 (first timing signal), corresponds to the "first timing signal output circuit". In addition, the comparator 45, which outputs the signal Vc3 (second timing signal), corresponds to the "second timing signal output circuit". Further, in an embodiment of the present disclosure, for example, the signal Vmask from the mask circuit 660 may be directly inputted to the drive circuit 46 without using the pulse circuit 41.

==Summary==

The switching control IC 10 according to embodiments of the present disclosure has been described above. The drive circuit 46 of the switching control IC 10 switches a transistor based on the error voltage Ve1 from the error amplifier circuit 43 in the case where the signal S1 is low, and switches a transistor based on the error voltage Ve2 from the error voltage output circuit 44 in the case where the signal S1 is high. Accordingly, the switching control IC 10 can be used in both the non-isolated power supply circuit 20 and the isolated power supply circuit 21.

Further, in the case where the signal S1 is high, the error amplifier circuit 43 stops outputting the error voltage Ve1. Thus, the drive circuit 46 can switch the transistor without being affected by the error voltage Ve1. Note that, in an embodiment of the present disclosure, the error amplifier circuit 43 causes its output to be in a high-impedance state, thereby stopping the output of the error voltage Ve1. This eliminates the need for providing a switch or the like (not illustrated) between the error amplifier circuit 43 and the inverting input terminal of the comparator 45, for example.

Further, in the case where the signal S1 is low, the error voltage output circuit 44 stops outputting the error voltage Ve2. Thus, the drive circuit 46 can switch the transistor without being affected by the error voltage Ve2.

Further, the error voltage output circuit 44 includes the resistor 60 that converts the bias current Ib from the phototransistor 530 to generate the error voltage Ve2. The resistance value of the resistor 60 can be freely selected. This makes it easy to adjust the conversion gain in generating the error amplification voltage Ve2 from the bias current Ib. Thus, the feedback loop in the power supply circuit 21 can be stabilized.

Further, the switching control IC 10, for example, may have memory such as an EPROM that stores a high or low signal, and select the error voltage Ve1 or Ve2 based on the information stored in the memory instead of using the signal S1. In such a case, however, a user needs to write the information in the memory at timing before the switching control IC 10 is used in a power supply circuit. The switching control IC 10 according to an embodiment of the present disclosure includes the determination circuit 33 that determines whether the power supply circuit in which the switching control IC 10 is used is of a non-isolated type or an isolated type, based on the voltage Va at the terminal A. Accordingly, the switching control IC 10 can determine whether the power supply circuit is of a non-isolated type or an isolated type without a user's operation or the like, and thus can reduce the user's time and effort.

Further, as illustrated in FIG. 8, the determination circuit 33 determines whether the power supply circuit is of a non-isolated type or an isolated type at a timing (e.g., the time t24) after the voltage Va reaches the breakdown voltage Vz0 at a predetermined level. Thus, in an embodiment of the present disclosure, it is possible to accurately determine whether the power supply circuit is a non-isolated power supply circuit or an isolated power supply circuit.

Further, the determination circuit 33 determines whether the power supply circuit is of a non-isolated type or an isolated type at the timing (e.g., the time t24) at which the signal ENB goes low. The switching control IC 10 starts switching the transistor after the signal ENB goes low. Thus, in an embodiment of the present disclosure, a circuit suitable for a non-isolated power supply circuit or an isolated power supply circuit can be selected before the switching of the transistor is started.

Further, in the case of the non-isolated power supply circuit 20, phase compensation elements for generating the error voltage Ve1 are coupled to the terminal B. On the other hand, in the case of the isolated power supply circuit 21, the phototransistor 530 is coupled to the terminal B.

Further, when the soft start period Ts has elapsed since startup, the switching control ICs 12 to 16 causes the time period during which the switching transistor is on to be longer than the time period before a lapse of the soft start period Ts. Thus, it is possible to prevent a large current from flowing through the switching transistors in the power supply circuits 20 to 22 when they start.

Further, the switching control ICs 12 to 16 gradually increase the time period T1, during which the switching transistor is on, in the soft start period Ts, as exemplarily illustrated in FIG. 14, for example. Thus, the switching control ICs 12 to 16 can start the power supply circuits 20 to 22 more safely.

Further, the comparator 603 of the switching control IC 12 determines the timing at which the NMOS transistor 303 is turned off, based on the lower one between the voltage Vo and the error voltage Ve2. With the use of the 3-input comparator 603 as such, it is possible to smoothly switch from the voltage Vo to the error voltage Ve2.

Alternatively, the voltage to be compared by the comparator 45 may be switched from the voltage Vo to the error voltage Ve2 when the soft start period Ts has elapsed, as in the switching control IC 13, for example.

Still alternatively, the oscillator circuit 631 of the switching control IC 15 may change the slope of the ramp wave Vr in the soft start period Ts without using the voltage Vo. Even with the use of such a configuration as well, a power supply circuit can be started safely.

Further, in the switching control IC 16, the discharge circuit 650 discharges the capacitors 132 and 133 at the terminal B when the switching control IC 16 is started. An isolated power supply circuit can be soft-started by using such a configuration.

Further, the mask circuit 660 of the switching control IC 17 masks the signal Vc2 for the mask period Tm1, Tm2 corresponding to the type of the power supply circuit, after the switching transistor is turned off. Accordingly, the switching control IC 17 can turn on the switching transistor at desired timing.

Further, the noise that occurs when the switching control IC 17 is used in an isolated power supply circuit may become larger than the noise that occurs when the switching control IC 17 is used in a non-isolated power supply circuit. Thus, in an embodiment of the present disclosure, the mask period Tm2 in the case where the switching control IC 17 is used in an isolated power supply circuit is set longer than the mask period Tm1 in the case where the switching control IC 17 is used in a non-isolated power supply circuit. This enables the switching control IC 17 to turn on a switching transistor at a more accurate timing.

Embodiments of the present disclosure described above are simply to facilitate understanding of the present disclosure and are not in any way to be construed as limiting the present disclosure. The present disclosure may variously be changed or altered without departing from its essential features and encompass equivalents thereof.

For example, in the power supply circuit 21, in order to generate the voltage Va, the resistor 520 and the Zener diode 521 are used to set a voltage Va outside the range in which the feedback voltage varies. However, the present disclosure is not limited thereto. Specifically, for example, a resistor may be used in place of the Zener diode 521 to divide the voltage Vx2 using the two resistors, and the divided voltage may be used as the voltage Va.

Further, as described above, upon startup of the power supply circuit 20, the feedback voltage Vfb is a value obtained by dividing the effective value of the AC voltage Vac using the resistors 120 and 121. Thus, in the power supply circuit 21, an element that outputs a voltage value smaller than the value obtained by dividing the effective value of the AC voltage Vac using the resistors 120 and 121 (e.g., 0.7 V, which is the forward voltage of a diode) may be used to generate the voltage Va. In such a case, the reference voltage Vref1 may be set between the value obtained by dividing the effective value of the AC voltage Vac using the resistors 120 and 121 and 0.7 V, which is the forward voltage of a diode, thereby enabling the determination circuit 33 to determine whether the power supply circuit is of a non-isolated type or an isolated type.

For example, in the error voltage output circuit 44, a MOS transistor that operates in a linear region may be used in place of the resistor 60.

Further, the switching control IC 10 is a circuit that operates in a mode in which a transistor is turned on when the inductor current IL becomes zero (a so-called critical mode), but may be, for example, a circuit that operates in a mode in which the inductor current IL continuously changes (a so-called continuous mode).

Further, the power supply circuit 21 is a flyback power supply circuit, but it is not limited thereto. For example, the power supply circuit 21 may be of a forward type, a push-pull type, a half-bridge type, a full-bridge type, or a chopper type.

Further, in an embodiment of the present disclosure, for convenience, the circuits for performing soft start of an isolated power supply circuit (e.g., the voltage output circuit 602 and the comparator 603), the circuit for performing a soft-start of a non-isolated power supply circuit (e.g., the discharge circuit 650), and the mask circuit have been separately described in embodiments. However, it is preferable that a switching control IC include all of them. With the use of such a switching control IC, it is possible to soft-start a power supply circuit as well as switch a switching transistor at desired timing.

According to the present disclosure, it is possible to provide a switching control circuit that is usable in a non-isolated power supply circuit and an isolated power supply circuit.

What is claimed is:

1. A switching control circuit for controlling a power supply circuit that includes
    an inductor to which an input voltage is applied and through which an inductor current flows, and
    a transistor configured to control the inductor current,
the switching control circuit being configured to switch the transistor based on the inductor current and an output voltage generated from the input voltage, the switching control circuit comprising:
    a first error voltage output circuit configured to output a first error voltage, corresponding to a difference between a level of the output voltage and a first level, based on a feedback voltage corresponding to the output voltage and a reference voltage, upon receiving a first signal indicating that the switching control circuit is used in a first power supply circuit, the first power supply circuit being of a non-isolated type;
    a second error voltage output circuit configured to output a second error voltage, based on an error signal corresponding to a difference between the level of the output voltage and a second level, upon receiving a second signal indicating that the switching control circuit is used in a second power supply circuit, the second power supply circuit being of an isolated type; and
    a drive circuit configured to
        switch the transistor based on the inductor current and the first error voltage, when the switching control circuit is used in the first power supply circuit, and
        switch the transistor based on the inductor current and the second error voltage, when the switching control circuit is used in the second power supply circuit.

2. The switching control circuit according to claim 1, wherein the first error voltage output circuit stops outputting the first error voltage, upon receiving the second signal.

3. The switching control circuit according to claim 1, wherein the second error voltage output circuit stops outputting the second error voltage, upon receiving the first signal.

4. The switching control circuit according to claim 3, wherein
    the error signal is a current corresponding to the difference between the level of the output voltage and the second level, and
    the second error voltage output circuit includes
        a switch configured to be turned on in response to the second signal, and be turned off in response to the first signal, and
        a resistor coupled in series with the switch,
    such that the current corresponding to the difference between the level of the output voltage and the second level flows through the resistor when the switch is on, to thereby generate the second error voltage.

5. The switching control circuit according to claim 1, wherein the switching control circuit is an integrated circuit, and further comprises:
    a first terminal that
        receives the feedback voltage when the switching control circuit is used in the first power supply circuit, and
        receives a voltage at a predetermined level when the switching control circuit is used in the second power supply circuit; and
    a determination circuit configured to determine whether the switching control circuit is used in the first power supply circuit or the second power supply circuit, based on a received voltage at the first terminal, and outputs the first signal or the second signal according to a result of the determination.

6. The switching control circuit according to claim 5, wherein when the switching control circuit is used in the second power supply circuit, the determination circuit performs the determination after the received voltage at the first terminal reaches the predetermined level.

7. The switching control circuit according to claim 6, wherein when the switching control circuit is used in the second power supply circuit, the determination circuit performs the determination before the transistor starts being switched.

8. The switching control circuit according to claim 1, wherein the switching control circuit is an integrated circuit, and further comprises a second terminal that
    outputs the first error voltage when the switching control circuit is used in the first power supply circuit, and
    receives the error signal from a phototransistor coupled thereto when the switching control circuit is used in the second power supply circuit.

9. The switching control circuit according to claim 1, wherein the drive circuit switches the transistor such that a time period during which the transistor is on is a first time period, until a predetermined time period has elapsed since the switching control circuit starts, and the drive circuit switches the transistor such that the time period during which the transistor is on is a second time period longer than the first time period, after the predetermined time period has elapsed since the switching control circuit starts.

10. The switching control circuit according to claim 9, wherein the drive circuit switches the transistor such that a length of the first time period gradually increases, until the predetermined time period has elapsed since the switching control circuit starts.

11. The switching control circuit according to claim 10, further comprising:
a first timing signal output circuit configured to output a first timing signal indicating a timing at which the transistor is to be turned on, based on a voltage corresponding to the inductor current;
a voltage output circuit configured to output a first voltage that becomes higher than a level of the second error voltage, when the predetermined time period has elapsed since the switching control circuit starts; and
a second timing signal output circuit configured to output a second timing signal indicating a timing at which the transistor is to be turned off, based on a lower one between the first voltage and the second error voltage,
wherein the drive circuit switches the transistor in response to the first and second timing signals.

12. The switching control circuit according to claim 10, further comprising:
a first timing signal output circuit configured to output a first timing signal indicating a timing at which the transistor is to be turned on, based on a voltage corresponding to the inductor current;
a voltage output circuit configured to output a first voltage, a level of which increases when the switching control circuit starts; and
a second timing signal output circuit configured to
output a second timing signal, indicating a timing at which the transistor is to be turned off, based on the first voltage, when the switching control circuit starts, and
output the second timing signal based on the second error voltage, when the predetermined time period has elapsed since the switching control circuit starts,
wherein the drive circuit switches the transistor in response to the first and second timing signals.

13. The switching control circuit according to claim 10, further comprising:
a first timing signal output circuit configured to output a first timing signal indicating a timing at which the transistor is to be turned on, based on a voltage corresponding to the inductor current;
an oscillator circuit configured to output an oscillating voltage having a triangular waveform; and
a second timing signal output circuit configured to output a second timing signal indicating a timing at which the transistor is to be turned off, based on the oscillating voltage and the second error voltage, wherein
the oscillator circuit changes the oscillating voltage to cause the time period during which the transistor to be on increases, when the predetermined time period has elapsed since the switching control circuit starts, and
the drive circuit switches the transistor in response to the first and second timing signals.

14. The switching control circuit according to claim 9, further comprising a discharge circuit configured to discharge, for a preset time period, a capacitor to which the first error voltage is applied, when the switching control circuit starts,
wherein the drive circuit turns on the transistor based on a voltage corresponding to the inductor current, and turns off the transistor such that the time period during which the transistor is on increases when a level of a charge voltage across the capacitor increases.

15. The switching control circuit according to claim 1, further comprising:
a first timing signal output circuit configured to output a first timing signal indicating a timing at which the transistor is to be turned on, based on a voltage corresponding to the inductor current; and
a mask circuit configured to
mask and output the first timing signal for a first mask period after the transistor is turned off, based on the first signal, and
mask and output the first timing signal for a second mask period different from the first mask period after the transistor is turned off, based on the second signal, wherein the drive circuit
switches the transistor based on an output of the mask circuit and the first error voltage when the switching control circuit is used in the first power supply circuit, and
switches the transistor based on the output of the mask circuit and the second error voltage when the switching control circuit is used in the second power supply circuit.

16. The switching control circuit according to claim 15, further comprising a second timing signal output circuit configured to output a second timing signal indicating a timing at which the transistor is to be turned off, based on an oscillating voltage having a triangular waveform and one of the first error voltage and the second error voltage,
wherein the drive circuit switches the transistor based on the output of the mask circuit and the second timing signal.

17. The switching control circuit according to claim 15, wherein the second mask period is longer than the first mask period.

18. A switching control circuit for controlling a power supply circuit that includes
an inductor to which an input voltage is applied and through which an inductor current flows, and
a transistor configured to control the inductor current,
the switching control circuit being configured to switch the transistor based on the inductor current and an output voltage generated from the input voltage, the switching control circuit comprising:
an integrated circuit that comprises:
a first terminal which
receives a feedback voltage corresponding to the output voltage when the switching control circuit is used in a first power supply circuit that is of a non-isolated type, and
receives a voltage at a predetermined level when the switching control circuit is used in a second power supply circuit that is of an isolated type; and
a determination circuit configured to determine whether the switching control circuit is used in the first power supply circuit or the second power supply circuit, based on a received voltage at the first terminal.

19. A switching control method for controlling a power supply circuit that includes
- an inductor to which an input voltage is applied and through which an inductor current flows, and
- a transistor configured to control the inductor current, by switching the transistor based on the inductor current and an output voltage generated from the input voltage, the switching control method comprising:
- outputting a first error voltage corresponding to a difference between a level of the output voltage and a first level, based on a feedback voltage corresponding to the output voltage and a reference voltage, upon receiving a first signal indicating that the power supply circuit is a first power supply circuit, the first power supply circuit being of a non-isolated type;
- outputting a second error voltage, based on an error signal corresponding to a difference between the level of the output voltage and a second level, upon receiving a second signal indicating that the power supply circuit is a second power supply circuit, the second power supply circuit being of an isolated type; and
- switching the transistor based on the inductor current and the first error voltage, when the power supply circuit is the first power supply circuit, and switching the transistor based on the inductor current and the second error voltage, when the power supply circuit is the second power supply circuit.

* * * * *